United States Patent [19]

Napolitano et al.

[11] 4,100,533
[45] Jul. 11, 1978

[54] MULTIPOINT POLLING TECHNIQUE

[75] Inventors: Orlando Napolitano, Millstone Township, Monmouth County; Robert Edward Reid, Bricktown; Burton R. Saltzberg, Middletown; Nathan Harold Stochel, Edison; John Ronald Tingley, Middletown, all of N.J.

[73] Assignee: Bell Telephone Laboratories, Incorporated, Murray Hill, N.J.

[21] Appl. No.: 747,700

[22] Filed: Dec. 6, 1976

[51] Int. Cl.² .......................... H04Q 5/00; H04J 3/04
[52] U.S. Cl. ................................... 340/147 R; 178/3; 179/15 BA
[58] Field of Search ......... 340/147 R, 152 R, 147 SC; 178/4.1 R, 4.1 B, 3; 179/15 A, 15 BA, 18 ES

[56] References Cited

U.S. PATENT DOCUMENTS

| 3,702,008 | 10/1972 | Groth | 179/15 BA |
|---|---|---|---|
| 3,755,781 | 8/1973 | Haas et al. | 340/147 R |
| 3,787,820 | 1/1974 | Sherman | 179/15 A |
| 3,866,175 | 2/1975 | Seifert, Jr. et al. | 340/152 R |
| 3,886,318 | 5/1975 | Charransol et al. | 340/147 SC |
| 3,921,138 | 11/1975 | Burns et al. | 340/147 R |

Primary Examiner—Donald J. Yusko
Attorney, Agent, or Firm—Roy C. Lipton

[57] ABSTRACT

A multipoint polling system wherein a multipoint switch selectively connects a plurality of remote terminals to a central station in response to remote terminal addresses transmitted on a signaling path to the multipoint switch. Polling apparatus stores portions of a remote terminal address list provided by the central station and transmits individual ones of the stored remote terminal addresses on to the signaling path. The polling apparatus periodically requests different portions of the remote terminal address list and replaces the stored remote terminal address portion with the requested remote terminal address portion.

The multipoint switch is advantageously comprised of a plurality of sections with each section of the switch responsive to a portion of the address list for establishing a signaling path between the central station and selected ones of the remote terminals defined by the address list portions. The failure of a multipoint switch section to respond to remote terminal addresses results in the address list portion normally transmitted to the failed section and the address list portion normally transmitted to a remaining active section being transmitted to the active section whereby the active section polls the remote terminals previously polled by both the failed and active sections.

19 Claims, 17 Drawing Figures

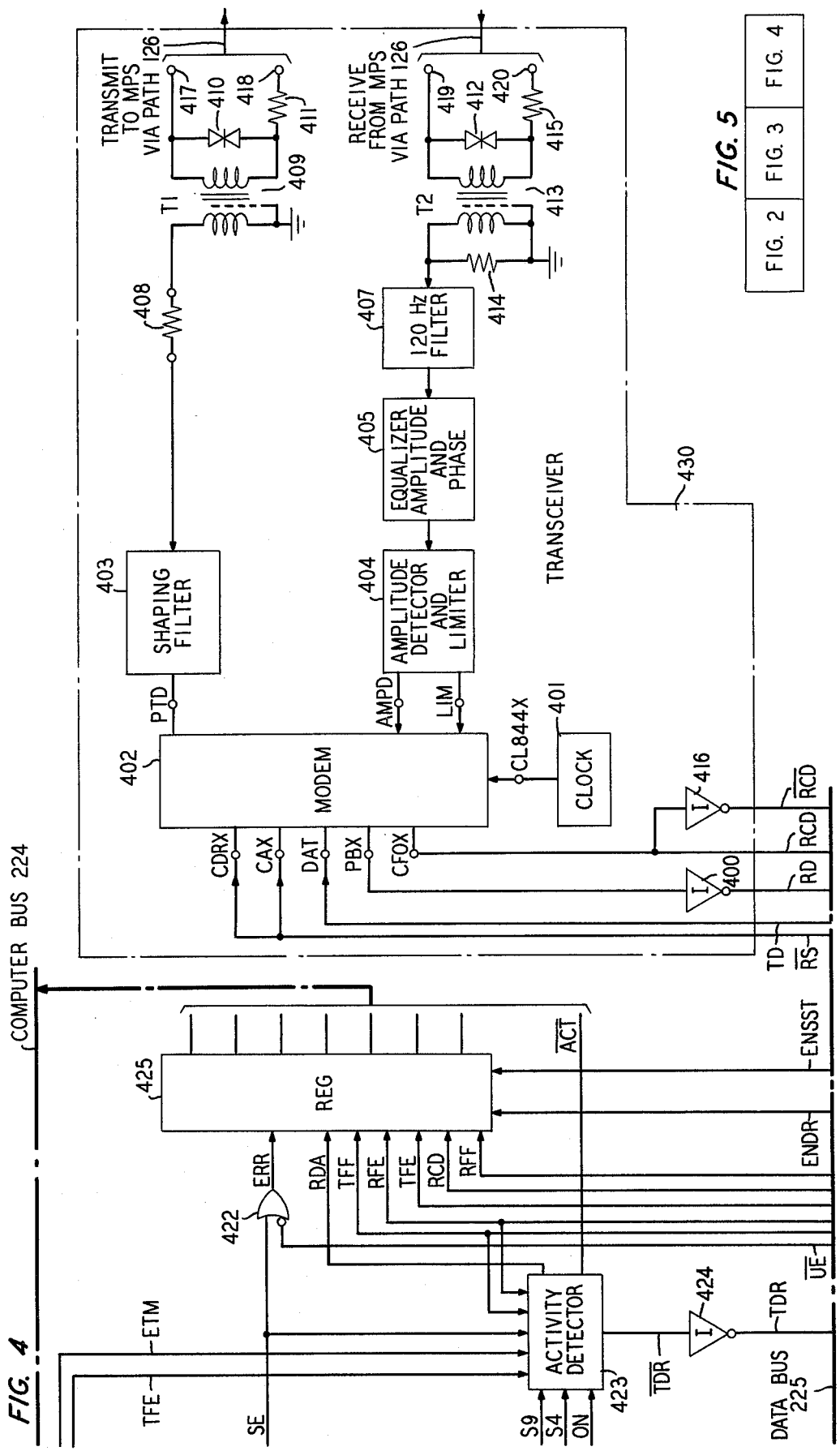

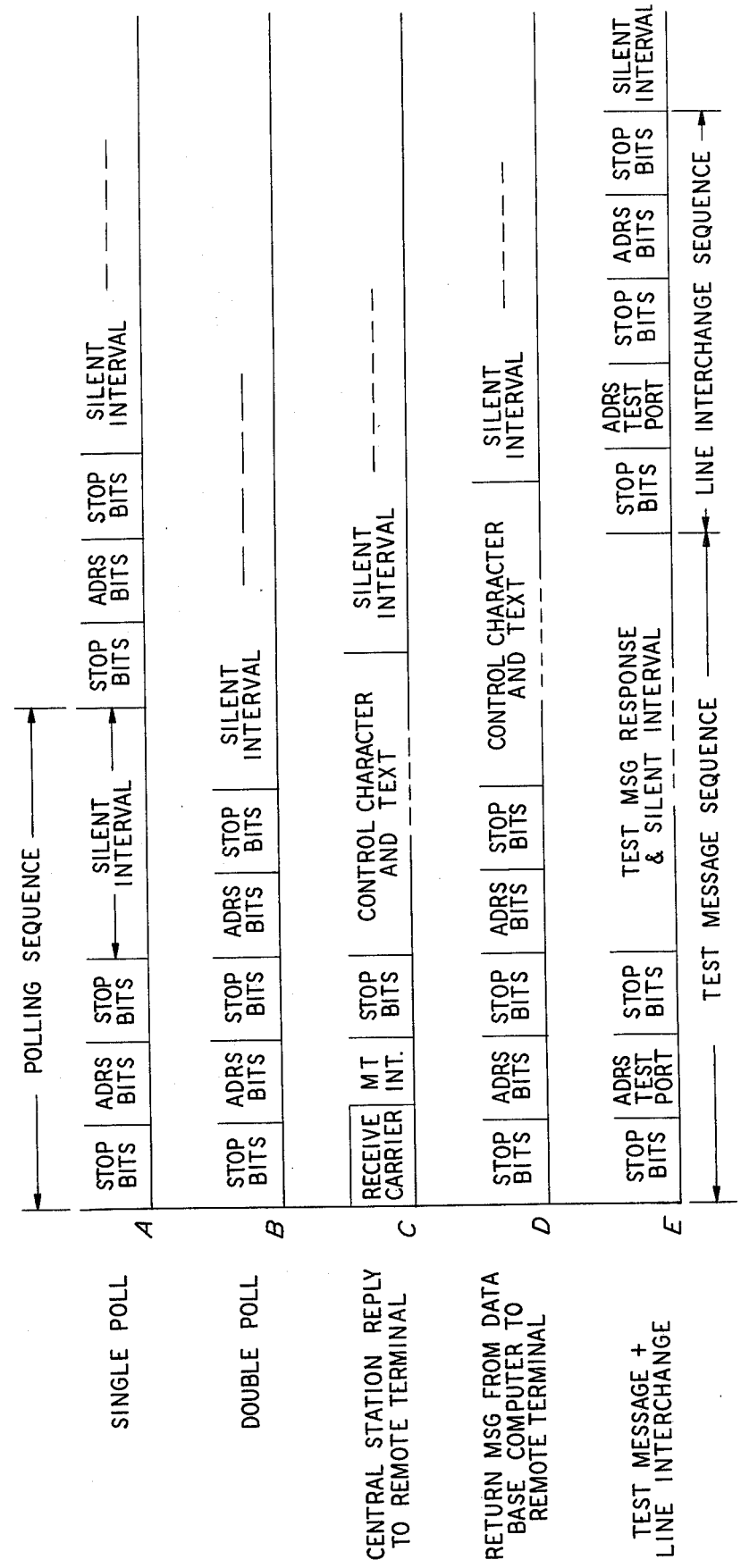

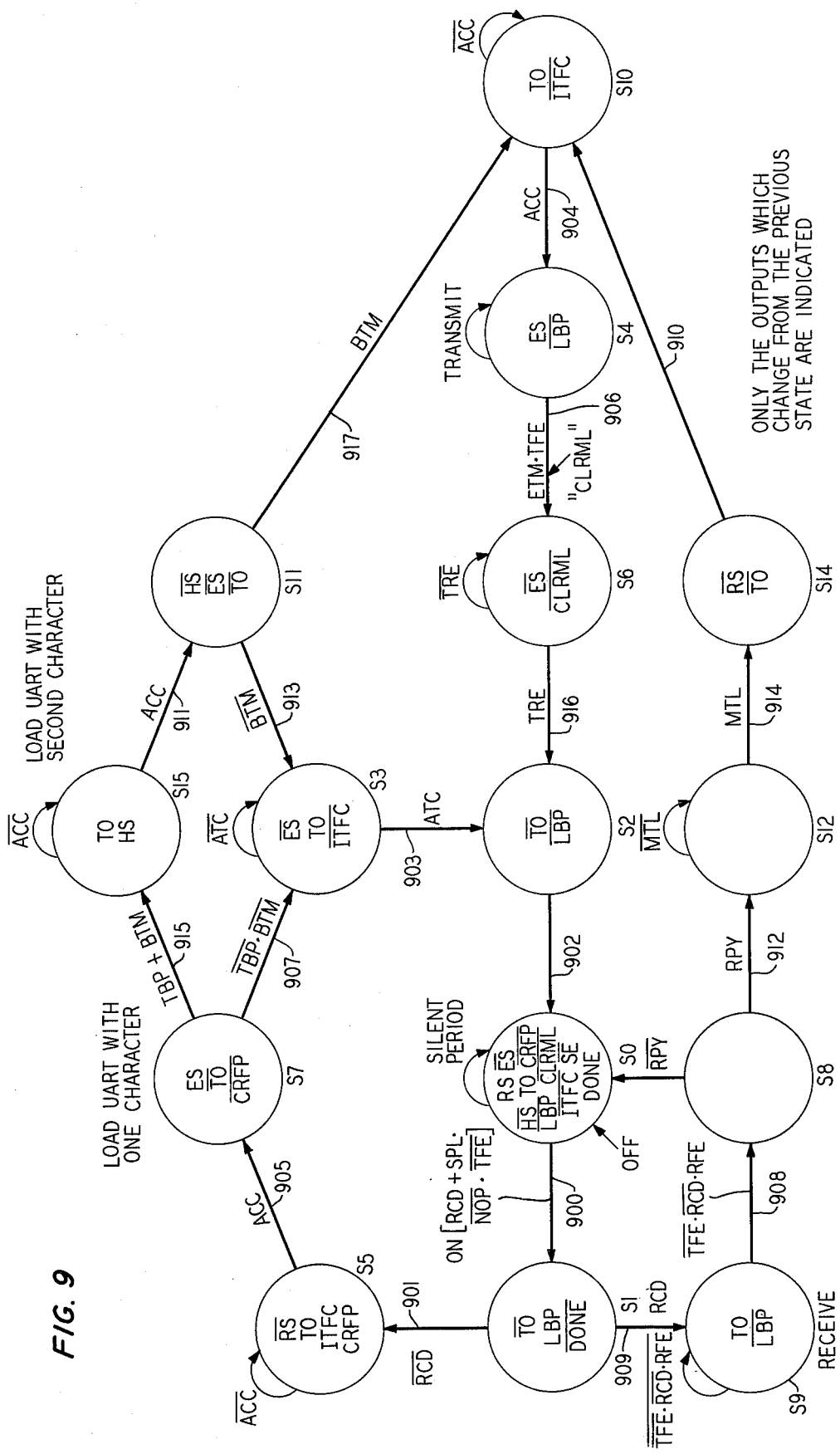

FIG. 10
SEQUENCER STATES AND OUTPUTS

| PRESENT STATE | SQ4= | NEXT STATE IF SQ4=0 | NEXT STATE IF SQ4=1 | RS | ES | HS | TO** | ITFC | CRFP | LBP | DONE | CLRML | SE |
|---|---|---|---|---|---|---|---|---|---|---|---|---|---|
| S0 | ON(SPL·$\overline{\text{NOP}}$·$\overline{\text{TFE}}$+RCD) | NC | S1 | — | 0 | — | — | 0 | 0 | 0 | 0 OR 1 | 0 | 0 |
| S1 | RCD | S5 |   | — | 0 | — | — | 0 | 0 | 0 | — | 0 | 0 |
| S2 | — | — | S0 | — | 0 | — | 0 | 0 | 0 | — | 0 | 0 | 0 |
| S3 | ATC | NC | S2 | 0 | 0 | — | — | 0 | 0 | 0 | 0 | 0 | 0 |
| S4 | (ETM)(TFE) | NC | S6 | 0 | 0 | — | — | 0 | 0 | — | 0 | 0 | 0 |
| S5 | ACC | NC | S7 | 0 | — | — | — | — | 0 | 0 | — | — | 0 |
| S6 | TRE | NC | S2 | 0 | 0 | — | — | — | — | 0 | 0 | 0 | 0 |
| S7 | TBP+BTM | S3 | S15 | 0 | — | — | — | 0 | 0 | — | 0 | 0 | 0 |
| S8 | RPY | S0 | S12 | 0 | 0 | — | 0 | 0 | 0 | 0 | 0 | 0 | 0 |
| S9 | $\overline{\text{TFE}}$·$\overline{\text{RCD}}$·RFE | S8 | NC | — | 0 | — | — | — | 0 | — | 0 | 0 | 0 |
| S10 | ACC | NC | S4 | — | 0 | — | — | 0 | 0 | — | 0 | 0 | 0 |
| S11 | BTM | S3 | S10 | 0 | 0 | — | — | 0 | 0 | — | 0 | 0 | 0 |
| S12 | MTL | NC | S14 | 0 | 0 | — | 0 | 0 | 0 | 0 | 0 | 0 | 0 |
| S13* | — | — | NC | — | — | — | — | — | 0 | 0 | 0 | 0 | — |
| S14 | — | — | S10 | 0 | 0 | — | 0 | 0 | 0 | 0 | 0 | 0 | 0 |
| S15 | ACC | — | S11 | 0 | — | 0 | — | — | 0 | — | 0 | 0 | 0 |

*SEQUENCE ERROR  
NC-NO CHANGE

**TO WILL BE ZERO WHEN TRE IS ZERO OR WHEN RCD IS ONE

MULTIPOINT POLLING TECHNIQUE

FIELD OF THE INVENTION

This invention relates to multipoint polling systems and more particularly to a multipoint polling system wherein polling apparatus polls a plurality of remote data terminals via a multipoint switch.

DESCRIPTION OF THE PRIOR ART

Multipoint polling systems wherein a central station selectively accesses a plurality of remote terminals are well known in the art. Such systems generally consist of two basic arrangements. The first arrangement illustrated by U.S. Pat. No. 3,866,175 issued to L. R. Seifert, Jr. et al on Feb. 11, 1975 is a party line arrangement wherein polling is accomplished by broadcasting addresses to all remote terminals. Each remote terminal is designed to recognize its own address from among the broadcasted addresses and each remote terminal responds to its own address by initiating communications with the central station. The second arrangement, illustrated by U.S. Pat. No. 3,921,138, issued to G. J. Burns et al on Nov. 18, 1975, utilizes a multipoint switch arrangement wherein a central station transmits remote terminal addresses on a signaling path to a multipoint switch which in response thereto extends the signaling path to selected ones of a plurality of remote terminals defined by the remote terminal addresses. The selected remote terminal, in response to a command signal transmitted on the signaling path from the central station, is enabled to initiate communications with the central station.

Both types of multipoint polling systems generally utilize one of two approaches to generate and transmit the remote terminal addresses. The first approach is to utilize an address generator which automatically generates the remote terminal addresses. Such an address generator may typically be apparatus controlled by the central station, which steps through a fixed counting cycle to sequentially generate a list of addresses. Address generators of this type are inherently limited to the generation of a fixed repetitive set of addresses. Certain addresses can be skipped or eliminated from the set but the basic order of addressing is fixed. Such an arrangement therefore reduces the flexibility of the polling system and makes it difficult if not impossible to revise or modify the polling order.

It is therefore an object of this invention to provide an improved means of address generation which allows for simple modification or revision of the polling order.

The second approach to address generation is utilized when the central station includes a computer, and involves storing the list of remote terminal addresses in the computer memory. With this approach, the computer polls the remote terminals by selectively retrieving a particular address from memory, transmitting the address to the remote terminal and then waiting for the remote terminal to transmit a response to the central station. This approach allows simple modification of the polling order by merely reprogramming the computer to select the addresses from memory in a different sequence. However, this approach also imposes a heavy real-time load on the computer as computer time must be spent in retrieving each address from memory and transmitting each address to the remote terminals. The imposition of this additional real-time load on the computer requires either an unnecessary limitation on the number of remote terminals to avoid overloading the computer or the use of a larger and more sophisticated computer at the central station. Such requirements increase the cost of the polling system or reduce the number of terminals the polling system can accommodate thereby rendering the system less attractive to potential users.

It is therefore another object of this invention to reduce the real-time load on the central station computer while maintaining the advantage of simple modification of the polling order.

The polling systems, as described above involve directly connecting the central station to a plurality of remote terminals in a party line arrangement or alternatively extending a signaling path from the central station to a multipoint switch to which the plurality of remote terminals are attached. These two arrangements are inherently susceptible to catastrophic failure in that the failure of the signaling path or the failure of the multipoint switch will result in a loss of service to a substantial number of remote terminals. This susceptibility to severe service failures is unacceptable in many polling environments where reliability is required.

It is therefore another object of this invention to increase the reliability of a multipoint polling system.

SUMMARY OF THE INVENTION

In accordance with the invention, polling apparatus stores portions of a list of remote terminal addresses provided by a central station and the polling apparatus transmits individual ones of the stored remote terminal addresses to a signaling path extending from the central station to the remote terminals. The remote terminal addresses define which remote terminals are to be connected to the central station.

It is a feature of the invention that the polling apparatus periodically requests different portions of the list of remote terminal addresses from the central station and replaces the stored portions of remote terminal addresses with the requested portions of remote terminal addresses. Different subsets of remote terminals defined by the different address list portions are thereby connected to the central station in response to the operation of the polling apparatus which reduces the real-time load on the central station computer.

It is another feature of the invention that in response to the commencement of a message transmission on a signaling path between the central station and the remote terminals polling is suspended, and that subsequent to the termination of the message transmission a different list of remote terminal addresses may be requested and polling recommenced. Modification of the polling order can therefore be accomplished each time a different list of remote terminal addresses is supplied to the polling apparatus.

It is another feature of the invention that a multipoint switch is utilized to selectively connect remote terminals to the central station, the multipoint switch being comprised of a plurality of sections and each section of the multipoint switch responding to a portion of the address list by completing a signaling path between the central station and the remote terminals defined by the address list portion. Failure of a multipoint switch section to respond to remote terminal addresses results in the address list portion normally transmitted to the failed section and the address list portion normally transmitted to a remaining active section being transmitted to the active section whereby the active portion polls the remote terminals previously polled by the failed portion as well as polling the remote terminals normally polled by the active portion.

It is a further feature of the invention that each section of the multipoint switch is connected to the central station via an associated signaling path and that failure of the central station to receive a test message transmission from a first section results in interchanging the signaling path connecting the first section to the central station with a signaling path connecting a second station to the central station. Subsequent to the interchange a test message is transmitted from the second section to the central station.

The foregoing and other objects and features of this invention will be more fully understood from the following description of an illustrative embodiment thereof in conjunction with the accompanying drawings.

BRIEF DESCRIPTION OF THE DRAWINGS

In the drawings:

FIGS. 2, 3 and 4 when arranged as shown in FIG. 5 disclose the details of the recirculating polling apparatus;

FIG. 8 discloses certain communications sequences utilized in the multipoint data communications system;

FIG. 9 discloses a state diagram for the sequence logic utilized in the recirculating polling apparatus;

FIG. 10 discloses a state table for the sequence logic; and

DETAILED DESCRIPTION

Figure 1:
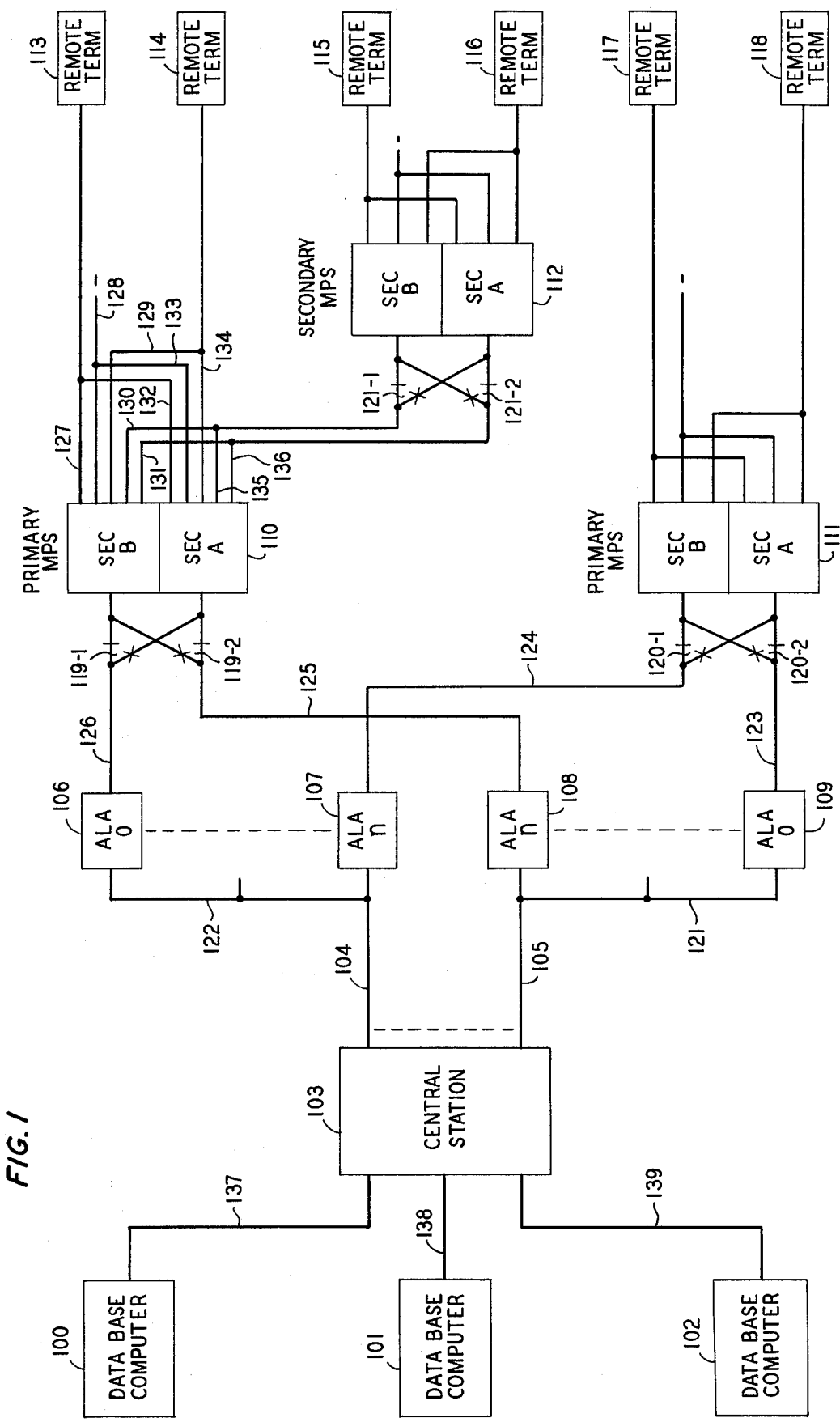
FIG. 1 discloses in block diagram form a multipoint data communications system containing multisection multipoint switches and recirculating polling apparatus.

Refer to FIG. 1. Therein is shown a block diagram representation of a multipoint data communications system designed for credit verification, electronic funds transfer or other inquiry/response applications. Data base computers 100-102 are general purpose computers remotely located from central station 103. These computers could be for example bank computers storing credit information of interest to a plurality of users. Alternatively, one of computers 100-102 could be a general purpose computer located at a business location from which a consumer desires to purchase merchandise, and another one of computers 100-102 could be the computer at the consumer's bank. The system in FIG. 1 could then function to provide electronic funds transfer between the business location computer and the bank computer each time a purchase was made by the consumer. Remote terminals 113-118 are inquiry/response terminals situated at remote locations such as establishments from which users desire to enter information into or extract information from one of the data base computers. Remote terminals 113-118 are of the type described in U.S. Pat. No. 3,921,138, and will not be discussed further hereinafter.

Data base computers 100-102 are connected to central station 103 via communication paths 137-139. In the preferred embodiment described herein, paths 137-139 are wideband data channels. Although only three data base computers are connected to central station 103, it is to be understood that central station 103 could accommodate a plurality of data base computers. Central station 103, in the preferred embodiment of this invention, is advantageously comprised of a data processor and associated data communications equipment. Central station 103 performs various functions as will be detailed hereinafter. These functions are readily accomplished by properly programming the data processor in central station 103. Such programming methods as well known in the art and will not be described in detail. Therefore it is to be understood that the following functions attributed to central station 103 are provided by proper programming of the data processor that is contained in central station 103.

Central station 103 functions to establish a communications path between remote terminals 113-118 and selected ones of the data base computers. More particularly, central station 103, in conjunction with Asynchronous Line Adapters (ALA) 106-109, functions to poll the remote terminals via Multipoint Switches (MPS) 110-112. The remote terminals, if they wish to communicate with a data base computer, respond to the polling signals and identify which data base computer they desire to communicate with. Central station 103 accepts messages from the remote terminals and transfers these messages to the identified data base computer. The data base computer processes the message, formulates a response, and that response is returned to the remote terminal by central station 103 in a manner to be detailed hereinafter.

Paths 104 and 105 extend from the central station to the ALAs. Each of paths 104 and 105 are data buses and allow the central station to communicate with a plurality of ALAs over each data bus. Although only two data buses are shown as extending from the central station to the ALAs it is to be understood that the central station could accommodate a plurality of data buses with each data bus providing access to a plurality of ALAs.

ALAs 106-109 function to receive a list of polling commands and remote terminal addresses from the central station and to thereafter autonomously poll the remote terminals. The ALAs also transfer messages between the central station and the remote terminals. The functions performed by the ALAs will be subsequently described in detail.

Figure 6:
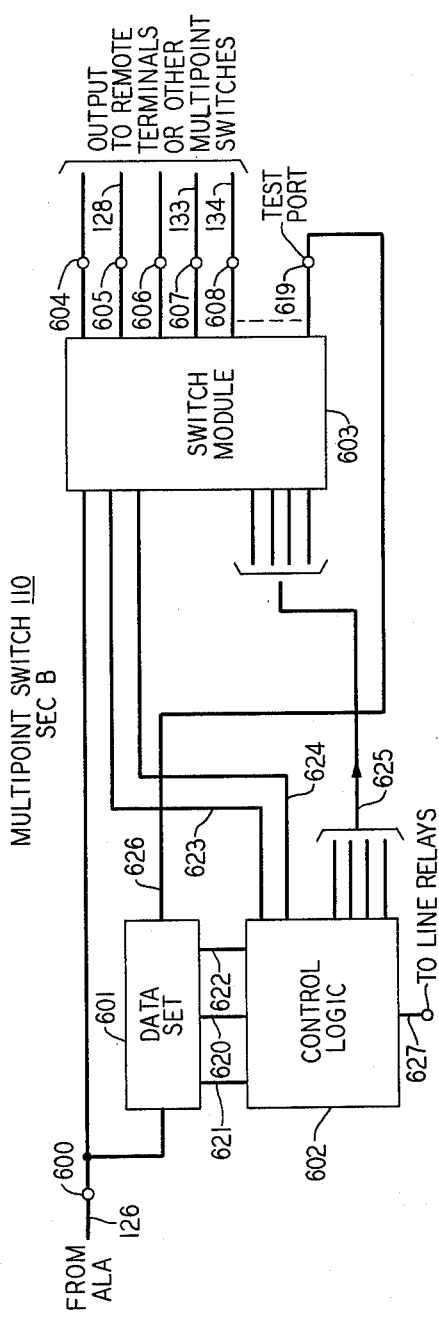
FIGS. 6 and 7 disclose certain details of the multisection multipoint switch.

Multipoint Switches 110-112 are preferably of the type described in U.S. Pat. No. 3,921,138 and function to selectively connect the ALAs to the remote terminals in response to remote terminal addresses transmitted from the ALAs. The multipoint switches can be arranged in either a primary or a secondary configuration. Multipoint switches 110 and 111 are primary multipoint switches wherein they are directly connected to respective ALAs. Multipoint switch 112 is a secondary multipoint switch wherein it is connected to the output of a primary multipoint switch. More particularly, each section of multipoint switches 110-112 is equivalent to one of the multipoint switches described in detail in U.S. Pat. No. 3,921,138. FIG. 6 of the instant application is a block diagram representation of one MPS section. This figure is identical to FIG. 2 in U.S. Pat. No. 3,921,138, except for the addition of signaling paths 620 and 626 and the designation of output 619 as a test port. Each section of multipoint switches 110-112 operates in the manner described in U.S. Pat. No. 3,921,138, except for minor variations to be subsequently described. Each section of multipoint switches 110-112 is connected to one ALA, or to one multipoint switch output, and each section is in turn cross-connected to its related section via line relay contacts 119-121. The outputs of each multipoint switch section are connected to a predetermined set of remote terminals or are connected to a secondary multipoint switch. Although only a limited number of remote terminals are shown, each being connected to a multipoint switch, it is to be understood that each multipoint switch can accommodate a plurality of remote terminals in accordance with the teachings in U.S. Pat. No. 3,921,138. Each output of each multipoint switch section is connected to an output of a related section and to a remote terminal or to a secondary multipoint switch. For example, output 127 of multipoint switch 110 Sec. B and output 132 of Sec. A are connected to remote terminal 113. Similarly, output 129 of Sec. B and output 134 of Sec. A are connected to remote terminal 114. Output 130 of Sec. B and output 135 of Sec. A are connected to Sec. B of multipoint switch 112. Connecting the remote terminals to the multipoint switches in this manner allows each multipoint switch section to establish a connection between its associated ALA and any of the remote terminals in the set of remote terminals connected to that multipoint switch. In the case of a tandem MPS arrangement, either MPS section can establish a connection between its associated ALA and a tandem MPS. The advantages of this dualized arrangement will be discussed hereinafter.

As previously discussed, the system in FIG. 1 functions to poll the remote terminals and to selectively establish communications between the remote terminals and the data base computers for the purpose of credit verification, electronic funds transfer, and other inquiry/response applications. This is accomplished in the following manner. Central station 103 has stored therein a list of remote terminal addresses. To begin a polling sequence, the central station, on its own initiative, or in response to an ALA request, extracts a list of remote terminal addresses from storage and stores in each ALA a particular portion of the list of remote terminal addresses. The particular portion of the list of stored addresses in each ALA corresponds to the set of remote terminals connected to the MPS section serviced by that ALA. For example, MPS 110 Sec. B will service selected ones of the remote terminals connected to its output lines 127-131. Therefore central station 103 will supply to ALA 106 the addresses of the selected remote terminals connected to the output lines of MPS 110 Sec. B. Similarly, MPS 110 Sec. A will service selected ones of the remote terminals connected to its output lines 132-136 and ALA 108 will have stored therein the addresses of those selected terminals. Subsequent to storing the address list portions in each ALA, central station 103 enables the ALAs to commence the polling sequence. Central station 103 thereafter will resume other tasks and will not provide additional service to the ALAs until inquiry/response messages are to be transferred between the central station and the remote terminals or until certain error messages are received from an MPS section. Each ALA begins to autonomously generate a sequence of polling commands. In response to the polling commands, each MPS section will poll the remote terminals defined by the address list portion stored in its associated ALA. This process continues until one of the remote terminals has a message to transmit to a data base computer and is polled. At this time, the remote terminal signals its associated ALA of its desire to transmit a message and that ALA ceases its polling sequence. The remaining ALAs, however, continue to autonomously poll the remote terminals defined by their address list portions. When an ALA is notified that a terminal has a message, it notifies central station 103 of the remote terminal's request to transmit. Central station 103 thereafter accepts the incoming message and transfers that message to the data base computer designated by the remote terminal. Thereafter central station 103 inserts the same list of remote terminal addresses or alternatively a new list of remote terminal addresses in the ALA and the ALA resumes polling. The data base computer which received the message processes that message in accordance with predetermined instructions and formulates a response to the remote terminal. This response is transmitted to central station 103. Central station 103 notifies the associated ALA to cease polling and instructs that ALA to address the remote terminal to which the response message is destined for. Central station 103 transfers the message to the remote terminal and thereafter inserts a new list of remote terminal addresses in the ALA and enables that ALA to recommence the polling sequence. In view of what precedes, therefore, it can be seen that each ALA independently polls its associated set of remote terminals. Once central station 103 loads the ALAs with the proper addresses, it is not required to perform additional polling tasks until after one of the remote terminals or the central station places a message on the signaling path between the central station and the remote terminals. Therefore, central station 103 can advantageously be utilized to perform other tasks while routine polling is being done by the ALAs.

An additional function performed by central station 103 is to periodically check the integrity of the multipoint polling system. To accomplish this function, central station 103 instructs an ALA to address a test port of a particular MPS section in a manner to be detailed hereinafter. In response thereto, that MPS section returns a test message to the central station which indicates that the particular section is operating properly and also indicates that its associated ALA and the path connecting that section to its associated ALA is in proper working order. Assume, for example, that a test port of MPS 110 Sec. B is addressed and the central station does not receive a test message response. This will indicate that Sec. B is not in service, path 126 is not in service, or alternatively that ALA 106 is not in service. When this occurs, central station 103 transmits a test message request to MPS 110 Sec. A via ALA 108 and path 125. Return of a test message indicates that ALA 108, path 125 and MPS 110 Sec. A are operating properly. Central station 103 next transmits a command sequence to MPS 110 Sec. A which in response thereto operates line relay 119 in a manner to be detailed hereinafter. Operating line relay 119 connects path 125 to Sec. B of MPS 110 and connects path 126 to Sec. A of MPS 110. Central station 103 will then transmit another test message request to MPS 110 Sec. B via ALA 108 and path 125. If a test message response is received, central station 103 then knows that either path 126 or ALA 106 is out of service. When this occurs, central station 103 will restore line relay 119 and take the address list portion previously stored in ALA 106 and transfer that portion to ALA 108. ALA 108 then resumes polling and will poll its previous set of remote terminals in addition to the set of remote terminals previously handled by ALA 106. This is accomplished by having ALA 108 poll the entire set of remote terminals via path 125 and Sec. A of multipoint switch 110. In this manner therefore, the failure of one communications path or one ALA will not result in a loss of service to the remote terminals serviced by that particular ALA or communications path. If, in the above example, central station 103 had not received a test message response from Sec. B, this would have indicated that MPS 110 Sec. B itself was not in service. In that instance, the address list portion for MPS 110 Sec. B could be placed in either ALA 106 or ALA 108 with line relay 119 released or operated respectively and the remote terminals would continue to be polled by MPS 110 Sec. A in the manner described above.

Recall from what precedes that each ALA generates polling commands that are transmitted to each MPS section and that in response thereto each MPS section establishes a signaling path between an addressed remote terminal and the ALA associated with that MPS section. Each MPS section essentially corresponds to the multipoint switch described in detail in U.S. Pat. No. 3,921,138. Therefore, only a general description will be given of the MPS response to polling commands. A detailed analysis of the manner is which each MPS section responds to a polling command can be obtained from U.S. Pat. No. 3,921,138 beginning with column 6, line 35 of that patent.

Refer to FIG. 8. Therein is shown the various polling commands and messages sent between the ALA, the multipoint switch and remote terminals. Waveform A in FIG. 8 describes the most common polling sequence. A polling sequence consists of a polling signal followed by a silent interval. As shown in FIG. 8, a polling signal consists of a first interval of stop bits (represented by FSK marking tone) a sequence of "1" and "0" bits defining the address of a remote terminal (represented by FSK mark and space tones, the first bit of the address being a start bit represented by FSK space tone) and a second interval of stop bits (represented by FSK marking tone). Subsequent to the polling signal the ALA ceases transmission for a silent no-tone interval before the commencement of another polling sequence. During this silent interval, the ALA looks for a response from the addressed remote terminal.

Referring specifically to FIG. 1, assume that ALA 106 transmits a polling sequence to MPS 110 Sec. B, the polling sequence containing the address of remote terminal 113. MPS 110 Sec. B detects the first interval of stop bits and thereafter operates in response to the address bits to complete a signaling path between ALA 106 and remote terminal 113. Subsequent to completing the signaling path, MPS 110 Sec. B blinds itself to signals on the signaling path and remains blinded until it detects an absence of signals on the signaling path for a predetermined interval of time. (The manner in which a multipoint switch blinds itself is described in detail in U.S. Pat. No. 3,921,138.) After this interval, the MPS will unblind itself in preparation for a new address. Terminal 113, upon the completion of the signaling path receives the second interval of stop bits followed by the silent interval. This interval of tone, followed by a silent interval, is a valid polling signal for all remote terminals as is described in detail in U.S. Pat. No. 3,921,138. If at this time remote terminal 113 had information to transmit to the ALA, it would be enabled and respond to the valid polling signal by initiating communications with the ALA. Waveform A in FIG. 8 assumes no response from a remote terminal. Therefore assuming no response ALA 106 would be at the conclusion of the silent interval, begin a new polling sequence consisting of an interval of stop bits, an interval of address bits of a new remote terminal, and a final interval of stop bits. This process would continue as ALA 106, in conjunction with MPS 110 Sec. B polled all the remote terminals whose addresses were initially stored in ALA 106 by the central station. In this manner therefore each ALA, utilizing the polling sequence in Waveform A, polls the remote terminals whose addresses are stored in the ALA.

Waveform B in FIG. 8 illustrates a polling sequence in which a remote terminal is connected to a secondary MPS. This is illustrated in FIG. 1 with remote terminal 115 for example being connected to MPS 112 Sec. B. ALA 106 would poll remote terminal 115 by utilizing the double poll sequence shown in Waveform B, FIG. 8. ALA 106 initially transmits a single poll sequence to MPS 110 Sec. B consisting of an interval of stop bits, an interval of address bits, and a second interval of stop bits. The first interval of address bits would, for a double poll, define the address of secondary MPS 112 Sec. B. At the conclusion of the single poll sequence, therefore, MPS 110 Sec. B will have established a signaling path between ALA 106 and MPS 112 Sec. B. Immediately subsequent to the single poll sequence, ALA 106 transmits a second interval of address bits and a final interval of stop bits. The second interval of address bits defines the address of remote terminal 115. MPS 112 Sec. B, in response to the second interval of address bits, extends the signaling path from MPS 110 to remote terminal 115. In this manner therefore each ALA, by employing the double poll sequence illustrated in Waveform B, can access any remote terminal connected to a secondary multipoint switch. The sequence just described is described in detail in U.S. Pat. No. 3,921,138 beginning with Column 6, line 10.

Waveform C, FIG. 8, illustrates a message sequence transmitted to a remote terminal by the central station immediately subsequent to the conclusion of the remote terminal's transmission of a message to central station 103. The purpose of this message sequence is to notify the remote terminal that its message has been correctly received by the central station. The first interval of Waveform C, labeled receive carrier, illustrates the conclusion of a remote terminal's transmission. Subsequent to the receive carrier interval, the ALA associated with the remote terminal will detect the termination of the receive carrier and begin timing an interval illustrated as the Message Turnaround (MT) interval in Waveform C. At the conclusion of the MT interval, the ALA will transmit stop bits, a control character, and an associated message to the remote terminal. The message is formulated by central station 103 and placed in an ALA in a manner to be detailed hereinafter. The stop bits are required by remote terminal 115 to detect carrier. The control character preceding the message is necessary for proper MPS operation. The stop bits are necessary for proper operation of the remote terminals. The purpose of the control character and the stop bits are described in detail in U.S. Pat. No. 3,921,138, beginning with column 13, line 20.

Waveform D, FIG. 8, illustrates the transmission sequence from an ALA to an MPS section when a message is being transmitted from a data base computer to a remote terminal. Recall from the previous description that each data base computer receives inquiries from a remote terminal, processes that inquiry, and subsequently formulates a response message to be transmitted to the remote terminal. Each time a data base computer has a message to send, it sends it to central station 103 and identifies which remote terminal the message is destined for. In response thereto, central station 103 selects the proper ALA and stores therein the address of the proper remote terminal and the message from the data base computer destined for that remote terminal. Central station 103 will then instruct the selected ALA to transmit the message to the remote terminal. This transmission sequence is illustrated in Waveform D and consists of a double poll address sequence followed by the aforementioned control character and the text of the message. The double poll address sequence contains the address of the proper remote terminal and a multipoint switch section, in response to this address, completes a signaling path between the ALA and the remote terminal. If the remote terminal to which a message is forthcoming is located on a primary MPS, the primary MPS will receive the second address but will not respond thereto as the primary MPS will have blinded itself in the manner described above. If the remote terminal is located on a secondary MPS a connection will be established to the remote terminal through the switches in the manner described above. The remote terminal connected to the secondary MPS would then be accessed in the manner described above. The polling address sequence shown in Waveform D corresponds to FIG. 4A in U.S. Pat. No. 3,921,138 and is described in detail therein.

Waveform E, FIG. 8, illustrates the transmission sequence required to implement the testing procedure of the MPS sections as described above. To implement this testing procedure each MPS section requires minor modifications not described in U.S. Pat. No. 3,921,138. These modifications will now be described in detail. Recall from the foregoing that a function performed by central station 103 is the detection of a faulty MPS section or associated signaling path and the capability to switch to an associated MPS section when a fault is detected. The functioning MPS section then assumes the polling task previously performed by the faulty MPS section. This function is performed with the MPS modifications shown in FIG. 6 and FIG. 7. FIG. 6 corresponds to FIG. 2 in U.S. Pat. No. 3,921,138 as has been described above with the addition of three signaling paths. Signaling path 620 extends from control logic 602 to data set 601, signaling path 626 extends from data set 601 to test port 619 and signaling path 627 extends to the line relays. Data set 601 described in U.S. Pat. No. 3,921,138, beginning with column 6, line 60, is a Bell System Data Set 202 or its equivalent. Such a data set is capable of receiving and decoding FSK information as was described in the U.S. Pat. No. 3,921,138, and is also capable of encoding binary information into FSK information for transmission. Signaling path 620 supplies binary information to data set 601 and in response thereto data set 601 converts this binary information into FSK information for transmission to the associated ALA via signaling path 626 and test port 619 in a manner to be detailed hereinafter.

Figure 7:
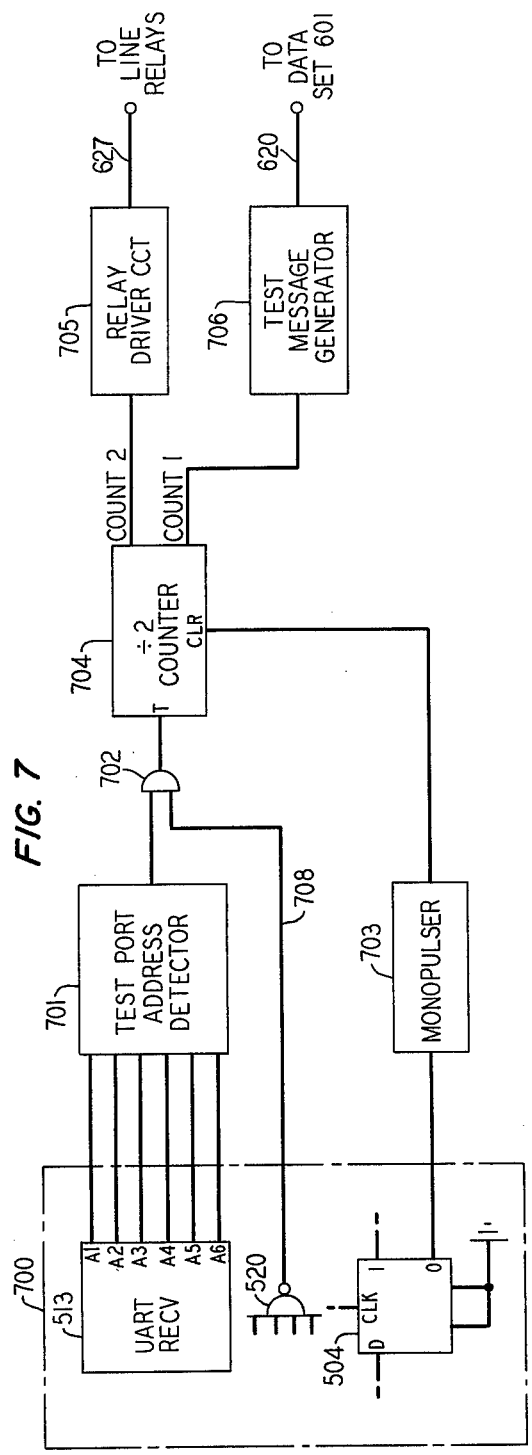

FIG. 7 illustrates internal modifications to the multipoint switch described in U.S. Pat. No. 3,921,138, the modifications being necessary to accomplish the test message and line interchange function described above. Block 700 in FIG. 7 contains selected portions of the multipoint switch control logic illustrated in FIG. 5 of the U.S. Pat. No. 3,921,138. UART 513, as described in detail in the U.S. Pat. No. 3,921,138, accepts incoming bits decoded by data set 201 (data set 601 in the instant application), does a parity check, and applies the 6 bits of the remote terminal address to the A1-A6 outputs of the UART. When the 6 bits are applied to the A1-A6 outputs, a strobe pulse is generated and applied to path 708 by gate 520 as is described in the U.S. Pat. No. 3,921,138 beginning with column 9, line 20. Flip-Flop 504 contained in block 700 is cleared each time there is a loss of signal on the signaling path as described in the U.S. Pat. No. 3,921,138 beginning with column 11, line 15. Address detector 701 functions to detect the address of the test port on the MPS switch module in response to the address signals being applied to the A1-A6 outputs of UART 513. Monopulser 703 generates a clear pulse applied to counter 704 in response to flip-flop 504 being placed in the CLEAR state. Test message generator 706 is enabled in response to counter 704 being in the count "1" state. The test message generator can be as simple as a binary storage register and functions simply to transmit a binary message to data set 601 which will in turn convert the message to FSK for transmission back to central station 103. Alternatively, the test message generator could sample various conditions existing in a multipoint switch section and generate a test message indicative of the various conditions existing in a multipoint switch section and generate a test message indicative of the various test points within the multipoint switch. For purposes of the instant application, test message generator 706 will be assumed to be a simple binary storage register. However, it is to be understood that the test message generator could perform more complex testing functions in a manner that is well known in the art. Relay driver circuit 705 is enabled in response to counter 704 being placed in the count "2" state. Circuit 705 drives the line relays whose contacts are shown in FIG. 1 and those line relays are operated in response to the relay driver circuit being enabled. The relay driver circuit upon operating the line relays holds the line relays in the operated state until the relay driver circuit is released with a count "2" pulse from counter 704. Although the relay driver circuit is not described in detail, it is clear that the functions performed by this circuit are well known in the art and therefore the circuit will not be further described in detail.

Referring now to Waveform E in FIG. 8, the test message and line interchange functions will be described in detail. Assume for example that central station 103 desires to test the integrity of an ALA, an MPS section and a connecting signaling path. Central station 103 would select from memory the MPS section test port address and store that address in the associated ALA. The ALA, in response thereto, would transmit the test message sequence shown in Waveform E. This sequence consists of an interval of stop bits, the test port address, and a second interval of stop bits. The multipoint switch section would receive the test message sequence and apply the test port address bits to the outputs of UART 513. This would be detected by address detector 701 which would in response thereto apply a high to one input of gate 702. The remaining input of gate 702 would also at this time be high in response to the strobe pulse received from the output of gate 520. Gate 702 would then apply a toggle pulse to counter 704 placing the counter in the count "1" state and enabling the test message generator. (Counter 704 is subsequently cleared by monopulser 703 which generates a clear pulse in response to flip-flop 504 being placed in the clear state during the silent interval shown in FIG. 8 Waveform E.) The test message generator would then begin transmitting a predetermined binary message to data set 601 via path 620. Data set 601 converts this binary message to FSK and transmits this message via path 626, test port 619 of switch module 603 and terminal 600 back to the central station via the ALA and the associated multiplexer. The central station examines the test message and makes a determination as to the integrity of the ALA, the MPS section and the connecting signaling path. If the central station is satisfied with the test message response it can be assumed that the tested equipment is in working order. The central station then reloads a new list of polling addresses in the ALA and instructs the ALA to resume polling.

Alternatively, the central station subsequent to the reception of a test message, may detect a malfunction based on the test message response or may receive no test message response at all. In this instance, the central station knows that the ALA, the MPS section, or the connecting signaling paths are out of order. Therefore, the central station would at this time desire to switch to the associated MPS section so that the remote terminals connected to that MPS would continue to be polled. To accomplish this function, the central station transmits the line interchange sequence shown in Waveform E to the associated MPS section in the manner described above. Central station 103 instructs the ALA associated with the MPS section to transmit the line interchange sequence to that MPS section. The sequence consists of a first interval of stop bits, test port address bits, a second interval of stop bits, the same test port address bits, followed by a concluding interval of stop bits. The multipoint switch section in response to this sequence detects the first interval of test port address bits which places counter 704 in the count "1" state. The second interval of test port address bits would be detected by the MPS section and would place counter 704 in the count "2" state. In response thereto, relay driver circuit 705 would be enabled and would operate the line relays associated with that particular MPS. In this manner, therefore, central station 103 can readily detect a defect in any MPS section, ALA, or connecting signaling path and in response to a defect, switch MPS sections so that polling of the remote terminals will not be interrupted.

Recall from what precedes that each ALA functions to autonomously poll a predetermined group of remote terminals the addresses of which have been placed in the ALA by the processor in central station 103. Each ALA under the command of the central station processor also transmits messages to and receives messages from the remote terminals. In addition, each ALA transmits test messages and line interchange sequences to the MPS sections. The manner in which each ALA performs these functions will now be described in detail.

Figure 2:
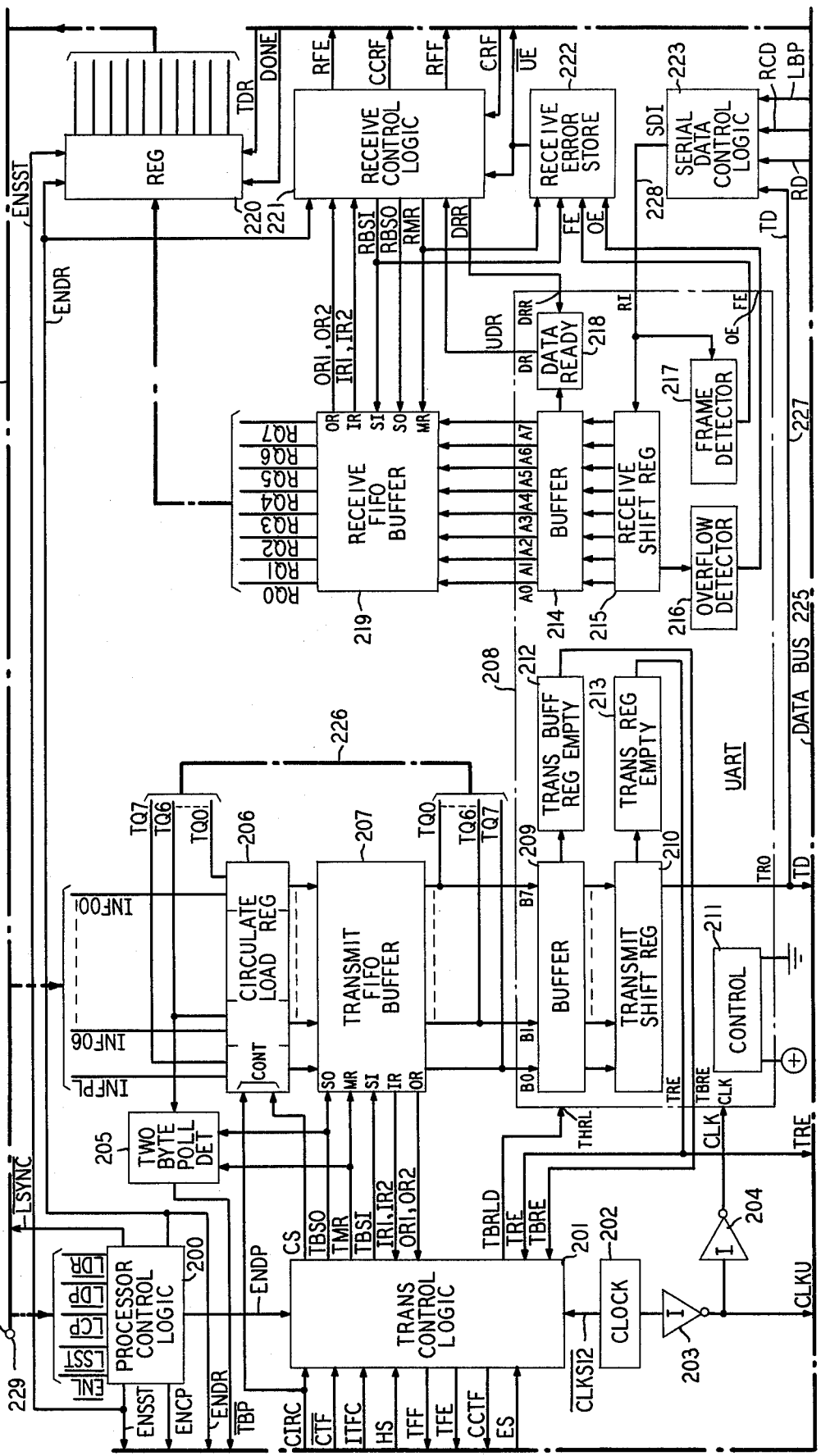
Figure 3:
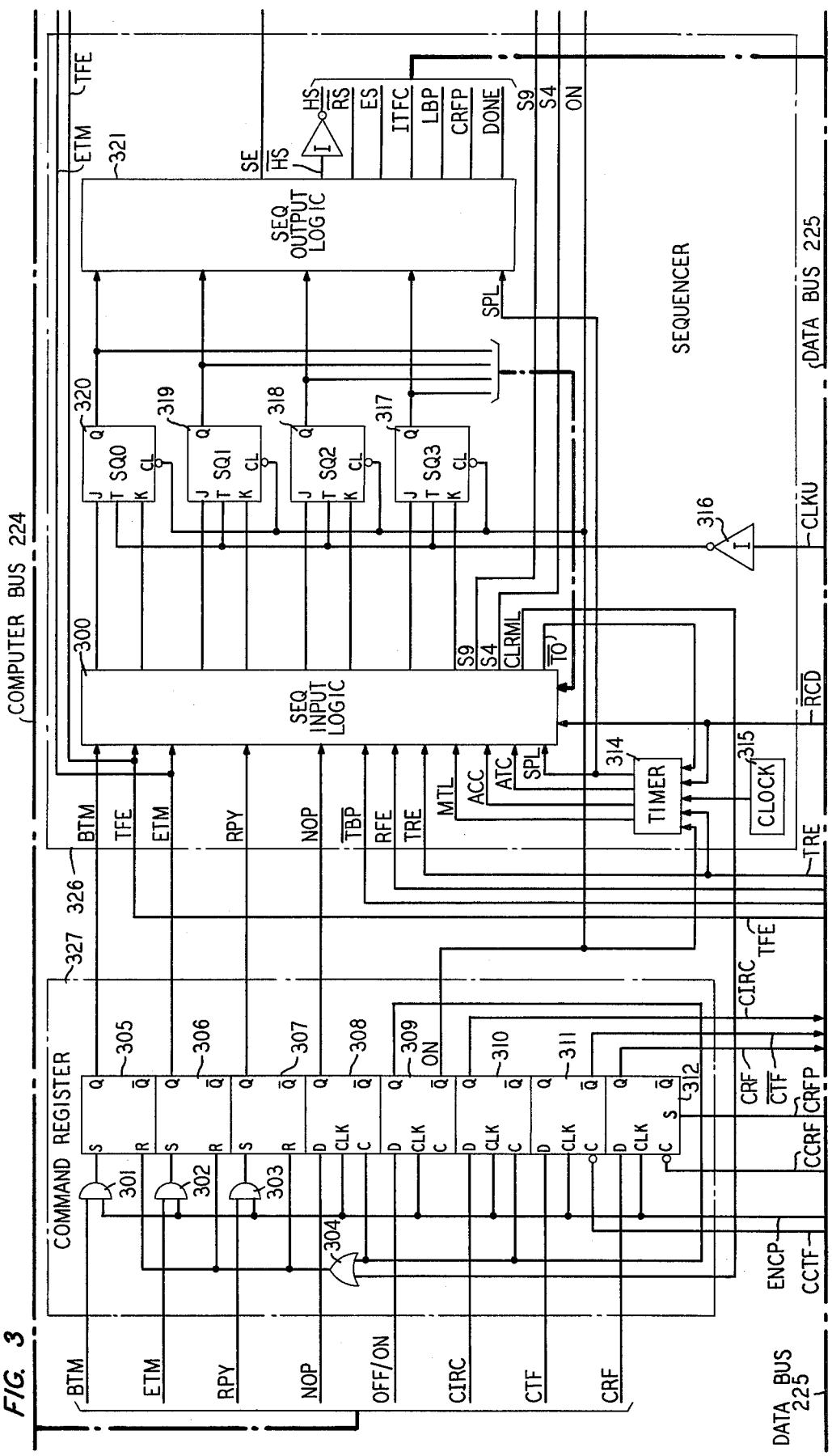

Refer to FIGS. 2, 3 and 4, which when arranged as is shown in FIG. 5, function to illustrate the details of an ALA. Assume that the ALA shown in FIGS. 2, 3 and 4 is ALA 106 illustrated in block diagram form in FIG. 1. The remaining ALAs shown in FIG. 1 are identical to ALA 106. Path 122 extending from central station 103 via path 104 is applied to input terminal 229 (FIG. 2) of ALA 106. This path functions to carry commands from the central station to ALA 106 and, in addition, this path carries messages being transmitted between the central station and the remote terminals. In the embodiment of the invention illustrated in FIGS. 2, 3 and 4, communication between the central station and each ALA via path 122 is assumed to consist of a parallel set of binary baseband transmission sequences where path 122 is a multiwire bus. It is to be understood however that the invention is not limited to this specific means of communication between the central station and each ALA, and in fact, path 122 could be any suitable communications medium.

Path 126 (FIG. 1) is a four-wire path extending from ALA 106 to MPS 110, Sec. B. The transmit leg of this four-wire path extends from output terminals 417 and 418, (FIG. 4) to the MPS and the receive path from the MPS is applied to input terminals 419 and 420. Communications between each ALA and its associated MPS is via Frequency Shift Keying (FSK) signaling. Therefore, the communication sequences shown in FIG. 8, occurring between an ALA and an MPS, are represented by bursts of FSK mark and space tones with a marking tone being equal to 1488 Hz and a spacing tone being equal to 1983 Hz. It is to be understood, however, that the invention described herein is not limited to this manner of communications between an ALA and an MPS, and in fact, path 126 could be any suitable communications medium, such as a two-wire path.

The ALA is comprised of five major sections: the command logic, the sequencer, the transmit logic, the receive logic, and the transceiver. The command logic generally consists of command register 327, logic 200, register 220 and register 425.

The command logic functions to accept commands from central station 103 via path 122 and data bus 224, and transfers these commands to selected sections of the ALA. The command logic also accepts status signals from selected sections of the ALA and transfers these status signals to the central station via bus 224 and path 122. The manner in which the command logic operates will be detailed hereinafter.

The sequencer designated by block 326 is the heart of the ALA. The sequencer 326 accepts commands from central station 103 and selected ALA sections and in response thereto, provides control signals necessary to operate the ALA. The sequencer consists of timer 314, clock 315, logic 300, logic 321 and flip-flops 317–320. Clock 315 is a free-running oscillator of the type well known in the art. Timer 314 is a multistate counter which provides output signals at predetermined intervals in response to the clock signal from clock 315. Logic 300, logic 321, and flip-flops 317–320 comprises a 15-state sequential switching circuit. A state diagram for the switching circuit is shown in FIG. 9 and a state table for the switching circuit is shown in FIG. 10. Switching circuits of this type are well known in the art and are described in detail in chapter 11 of *Introduction to the Logical Design of Switching Systems* by H. C. Torng, Edison-Wesley Publishing Company, 1964. Given the state diagram shown in FIG. 9 and the state table shown in FIG. 10, the process for designing logic 300 and logic 321 is described in detail in Torng. Therefore, the details of logic 300 and logic 321 will not be further described. The operation of this sequencer will be described in detail hereinafter.

The ALA transmit logic generally consists of circulate-load register 206, transmit first-in-first-out (FIFO) buffer 207, control logic 201 and the transmit portion of UART 208. The circulate-load register is constructed of eight dual input D type flip-flops. In addition, the register contains mode control gates to select one of two inputs in response to control signals applied to its control inputs. The circulate-load register functions to gate information from its input to the transmit FIFO in response to a strobe control as will be subsequently described. The transmit FIFO is a 64-word first-in-first-out serial memory. Such devices are well known in the art and could for example be Memory FC3341 provided by Fairchild Camera and Instrument Corporation. The transmit FIFO in response to certain control signals accepts input information from register 206 and propagates this information to the FIFO output where it can be loaded into the UART buffer as will be subsequently described. UART 208 is an asynchronous receiver/transmitter of the type well known in the art, and could for example, be asynchronous receiver/transmitter TMS 6011 manufactured by Texas Instruments Incorporated. The function of the UART will be subsequently described in detail. The transmit logic under the control of the sequencer functions to transmit polling signals to the remote terminals via the MPS sections and also functions to transmit messages from the central station to the remote terminals. The transmit logic accomplishes the transmission of polling signals in the following manner. Central station 103, in a manner to be detailed hereinafter, applies a list of remote terminal addresses to register 206 via path 122 and bus 224. As described above, this list of remote terminal addresses is the list of addresses for the remote terminals associated with the ALA in which the addresses are stored. Register 206 in response to commands from logic 201 accepts the addresses from bus 224 and applies the addresses one at a time to transmit FIFO 207. Transmit FIFO 207 accepts the addresses and propagates each address to the FIFO output. Therefore, as the addresses are applied to FIFO 207, they are stacked in the FIFO in the order in which they were received from central station 103. After the complete list of addresses has been stored in FIFO 207, the central station in a manner to be detailed hereinafter, instructs the ALA to commence polling. In response thereto, the transmit FIFO transfers the addresses one at a time to buffer 209 in UART 208. At this same time, the addresses are recirculated via bus 226 back to the input of register 206. Each address transferred to the UART is stored in buffer 209 and a start and stop bit is at this time added to the address. The address is then transferred to UART transmit register 210. This register serializes the address and transmits the address via bus 225 to modem 402. The address is then converted to FSK signals and transmitted to the MPS in a manner to be detailed hereinafter. Recall from the foregoing that as each address was applied to buffer 209 it was recirculated via path 226 back to the input of register 206. This recirculation process continues as each individual address is sequentially and repetitively applied to UART 208. Therefore, once a list of addresses have been stored in FIFO 207, the ALA will continuously transmit polling addresses to the multipoint switch sections until the polling process is stopped by the central station or by the receipt of an incoming message from a remote terminal. Therefore, once the processor in central station 103 provides a list of addresses to the ALA, it is free to perform other tasks while the ALA functions to continuously poll the remote terminals.

An additional function performed by the transmit logic is the transmission of messages from the central station to the remote terminals. The central station when it has a message to send, assembles the message, and places the address of the terminal to which the message is destined at the head of the message. The complete message including the address is then stored in FIFO 207. The ALA, in a manner to be detailed hereinafter, is then instructed to transmit the message to the remote terminal. The transmit logic sends out the address to the multipoint switch, which in response thereto, completes a connection between the ALA and the remote terminal. Thereafter the transmit logic transmits the message stored in FIFO 207 to the addressed remote terminal.

The receive logic generally consists of receive FIFO 219, control logic 221, error store 222, and the receive portion of UART 208. The receive logic functions to receive messages from the remote terminals and to transfer these messages to the central station via bus 224 and path 122. More particularly, messages are received by the transceiver in FIG. 4 and converted from FSK signals to baseband binary signals. These signals are applied via path 225 to logic 223, and in turn, applied via path 228 to register 215 in the UART. The incoming serial data is shifted into the receive register of the UART and formed into words. Start and stop bits are stripped off the serial data and the remaining 8 bits of the data word are loaded into UART buffer 214. The UART performs certain error checks to be subsequently described and thereafter transfers the data from buffer 214 to receive FIFO 219 (receive FIFO 219 is of the same type as transmit FIFO 207). The receive FIFO under the control of logic 221 stores the received message one word at a time and stacks the received message in the same manner as FIFO 207 stacked messages from the central station. Each word of the message is then subsequently transferred to register 220 and thereafter is sent to the central station via bus 224 and path 122. The details of the receive logic will be described hereinafter.

The transceiver shown in FIG. 4 consists of clock 401, modem 402 and various other filtering, limiting, and lightning protection circuitry. The transceiver functions to receive FSK messages from the remote terminals and to convert these FSK messages to baseband binary signals for use by the ALA. The transceiver also accepts baseband binary signals from the ALA and converts these signals to FSK transmission sequences for transmission to the remote terminals. The heart of the transceiver is modem 402. This modem performs the conversion functions from FSK to baseband and vice versa. Such modems are well known in the art and could for example be Modem A7Q3X0219-SL35213 manufactured by Fairchild Semiconductor, Incorporated. The details of the transceiver will be described hereinafter.

Each ALA section will now be described in detail. During the course of the following description certain commands are received from and transmitted to the processor in central station 103. The generation and processing of these commands can be accomplished by any general purpose computer which is programmed in accordance with well known programming techniques. Therefore the details of the central station processor will not be further described.

Command Logic

Figure 11:
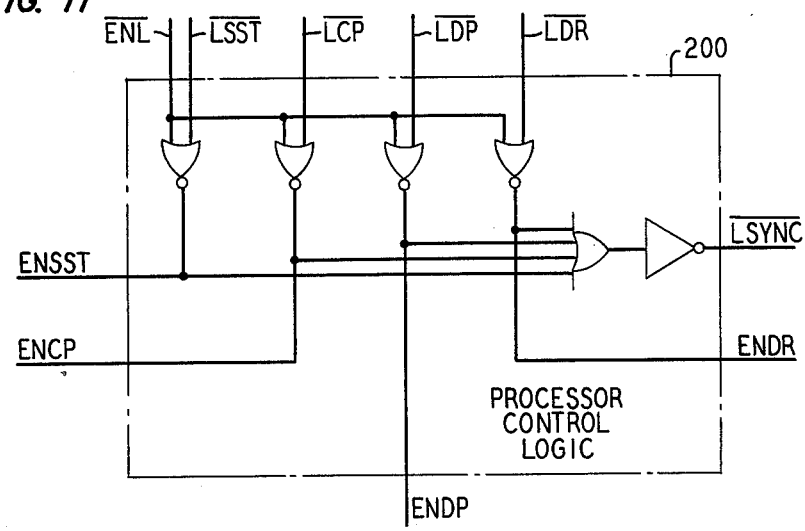
FIGS. 11-17 disclose the details of certain functional blocks shown in FIGS. 2-4.

As described above, the ALA command logic consists of logic 200, command register 327, register 220 and register 425. Logic 200 functions to receive certain commands from the processor in central station 103 and in response to these commands provides certain control signals for the ALA. Command $\overline{ENL}$ which is applied to logic 200 is a command from the processor in central station 103 which enables logic 200 to pass one of four other processor commands to the ALA. When logic 200 receives command $\overline{ENL}$ it is an indication that a additional command is forthcoming from the processor. Command $\overline{LCP}$ from the processor indicates to logic 200 that a command is present on bus 224. Logic 200 in response to command $\overline{LCP}$ generates strobe command ENCP. This command is applied to command register 327 via bus 225 and functions to strobe certain commands from bus 224 into the command register. Command $\overline{LDR}$ indicates to logic 200 that the processor in central station 103 is requesting data from the ALA. In response to this command, logic 200 generates command ENDR which is applied to register 220, logic 221 and is also applied to register 425 via bus 225. This command functions to strobe certain information on to bus 224 from registers 220 and 425. Command $\overline{LSST}$ is a request from the processor to the ALA which indicates the processor desires certain status bits to be transmitted from the ALA. Logic 200 in response to this command generates command ENSST. This command is applied to register 220, and to register 425 via bus 225. Command $\overline{LDP}$ indicates to logic 200 that incoming data is present on bus 224. Logic 200 in response to this command generates command ENDP which is applied to control logic 201. When either of the aforementioned commands are received by logic 200, logic 200 generates command $\overline{LSYNC}$ which acknowledges receipt of the commands sent from the processor. $\overline{LSYNC}$ is sent to the processor via bus 224 and path 122. The details of logic 200 are shown in FIG. 11, and the operation of logic 200 will be clear to one skilled in the art upon examination of the details shown in FIG. 11.

Command register 327 consists of flip-flops 305-312. This register functions to store certain commands from the central station processor which are subsequently applied to various sections of the ALA. Recall from the foregoing that each time the processor applies a command to bus 224, it applies command $\overline{LCP}$ to logic 200 which in response thereto generates command ENCP. Command ENCP is applied to gates 301-303, to the clock inputs of flip-flops 308-312 and functions to strobe the command on bus 224 into register 327. Command BTM from the processor is gated into flip-flop 305 and in turn is applied to the sequencer. Command BTM is asserted by the processor each time a message from one of the data base computers is being transmitted to the remote terminals via central station 103. Command ETM is gated into flip-flop 306 and from there is applied to the sequencer. Command ETM is asserted by the processor when the last word to be transmitted to a remote terminal has been loaded into the transmit FIFO by the processor. Command RPY is stored in flip-flop 307 and from there is applied to the sequencer. Command RPY is asserted by the processor each time the processor desires to send a central station message to a remote terminal. This command is to be contrasted with command BTM which is used for messages originating with the data base computers and not for messages originating with the central station processor. Command NOP is stored in flip-flop 308 and is applied to the sequencer. Command NOP is asserted by the processor each time the processor wishes to suspend the polling function of the ALA. Polling is suspended in response to the NOP command and remains suspended until the NOP command is invalidated by the processor. The processor normally utilizes this command while it is sorting a list of addresses in the ALA for the commencement of a new polling sequence. The OFF/ON command is stored in flip-flop 309. The OFF command sets the Q output of flip-flop 309 to a logical "1" and the $\overline{Q}$ output to a logical "0". The Q output is applied to the input of gate 304 and to the clear input of flip-flops 308 and 310. This functions to clear flip-flops 305-308 and flip-flop 310. The $\overline{Q}$ output also resets timer 314, clears flip-flops 317-320 and inhibits certain logic in activity detector 423. The ON command sets the $\overline{Q}$ output of flip-flop 309 to a logical "1" which when applied to timer 314 enables the timer and allows the ALA to commence operation. The CIRC command is stored in flip-flop 310 and is applied via bus 225 to logic 201 and to register 206. The CIRC command when equal to a logical "1" allows recirculation to occur between the transmit FIFO and the circulate-load register. The CIRC command when equal to logical "0" prevents recirculation between the transmit FIFO and register 206. The manner in which this is accomplished will be described hereinafter. Command CTF is stored in flip-flop 311 and is applied as $\overline{CTF}$ via bus 225 to logic 201. Command CTF is asserted by the processor to clear the transmit FIFO of all data before the transmit FIFO is utilized to transmit messages to the remote terminal. Command CTF is also utilized to clear the transmit FIFO before polling addresses are loaded therein. The manner in which this is accomplished will be described hereinafter. Command CRF is stored in flip-flop 312 and is transferred via bus 225 to logic 221. Command CRF is asserted by the processor each time the processor desires to clear the receive FIFO. As will be subsequently described, command CRF is generated by the processor in response to the detection of errors in the incoming data by UART 208.

Register 425 in response to commands ENDR and ENSST functions to transfer certain status bits from the ALA to the processor via bus 224. When either command ENDR or ENSST is applied to register 425, all seven status bits are transferred from the input of the register to bus 224. Status bit TFE is a bit generated by logic 201 and functions to inform the processor that the transmit FIFO is empty. This command informs the processor that additional information is required so that the ALA can continue polling or can continue transmitting messages to the remote terminals. Command RCD is generated by the transceiver each time a message is forthcoming from a remote terminal. Command ERR is an error flag comprised of the logical OR or a sequence error generated by the sequencer and a receive error bit generated by UART 208. When either of these errors is generated by the sequencer or by the UART, the ERR command is applied to register 425. Command RFE is generated by logic 221 and indicates that the receive FIFO is empty. This command is utilized to inform the processor when the last character of an incoming message has been strobed from receive FIFO into register 220. Command RDA is generated by activity detector 423 and indicates that receive data is available in the receive FIFO which is waiting to be strobed from the receive FIFO to register 220. As long as command RDA is asserted to register 425, it indicates to the processor that there is additional information waiting in the receive FIFO for transmission. The maner in which the activity detector generates command RDA will be detailed hereinafter. Command TFF is generated by logic 201 and indicates to the processor that the transmit FIFO is filled with characters and that additional characters cannot be loaded into the transmit FIFO until some characters have been transmitted. Command RFF is generated by logic 221 and indicates to the processor that the receive FIFO is full. This command is an indication to the processor that additional characters should be unloaded from the receive FIFO before new characters can be received from the remote terminal.

Register 220 functions to transfer incoming data from receive FIFO 219 to bus 224 and also functions to transfer status bits TDR and DONE to the processor via bus 224. Each time command ENSST is generated by logic 200 and applied to register 220, the two status bits are transmitted to the processor. When command ENDR is asserted by logic 200 and applied to register 220, the 8 data bits from the receive FIFO and the two status bits are transmitted to central station 103. Command DONE is a command generated by the sequencer and indicates to the processor that the ALA is in an idle mode and is awaiting additional commands from the processor. Command TDR is generated by activity detector 423 and indicates to the processor that the ALA is attempting to transmit but that there are no characters in the transmit FIFO to be sent out.

Transmit Logic

As described above, the transmit logic consists of control logic 201, register 206, transmit FIFO 207 and the transmit section of UART 208. Control logic 201 accepts eleven input signals and generates eight output signals utilized to control various transmission sequences. The input signals accepted by logic 201 include command CIRC. Logic 201 in response to the CIRC command being equal to a logical "1" applies command TBSO to transmit FIFO 207. This command functions to strobe information from the output of the transmit FIFO to the input of register 206. Command CIRC is also applied to the control input of register 206. When CIRC is equal to a logical "1," register 206 accepts input data on leads TQO through TQ7. Therefore, when CIRC is equal to a logical "1," and command TBSO is equal to a logical "1" information is strobed from the output of the transmit FIFO to the input of register 206. When CIRC is equal to a logical "0," logic 201 asserts command CS. This command is generated by logic 201, when CIRC is equal to a logical "0" and when command ENDP is applied to logic 201 by logic 200. Command CS is applied to register 206 and functions to strobe information from bus 224 into register 206. CIRC being equal to logical "0" causes register 206 to accept information from bus 224 and to exclude information from bus 226. Command TBSI is generated by logic 201 in response to the generation of command CS. Command IR1, IR2, being applied to logic 201 by the transmit FIFO, resets TBSI. Command IR1, IR2 consists of two identical commands generated by two identical sections of the transmit FIFO and indicates that the transmit FIFO is ready to accept incoming information. Each time command IR1, IR2 goes high and CS goes high, command TBSI is generated which functions to strobe information from register 206 into the transmit FIFO. Command TBSO is generated by logic 201 and functions to strobe information from the transmit FIFO to the UART. Command TBSO is generated in response to command ES from the sequencer command TBRE from the UART and command OR1, OR2, from the transmit FIFO. Command ES is an enable strobe command which is generated by the sequencer under certain conditions as will be subsequently described. Command OR1, OR2 consists of two identical commands generated by two identical sections of the transmit FIFO and indicates that the transmit FIFO is ready to transfer a character from the FIFO to buffer 209. An addition condition necessary for the generation of TBSO is assertion of command TBRE which is generated by UART 208. This command is generated each time the transmit buffer of the UART is empty. Therefore, command TBSO is generated by logic 201 when the transmit FIFO is ready to output a character indicated by assertion of command OR1, OR2, the UART is ready to receive a character indicated by assertion of command TBRE and when the ES command is asserted by the sequencer. Command TBRLD is the inverse command TBSO and functions to strobe information into the UART buffer as it is strobed out of transmit FIFO in response to command TBSO. Command HS is generated by the sequencer and is applied to logic 201. Command HS is a holding strobe command and is generated by the sequencer in conjunction with a double load sequence as will be described hereinafter. Logic 201 in response to command HS gates command TBSO to a logical "1" state and gates command TBRLD to a logical "0" state. The result of the HS command being applied to logic 201 is that the character presently contained in the UART buffer is prevented from being transferred to register 210 and thus is prevented from being transmitted while the HS command is being asserted, as described above. Command TRE is generated by the UART when the transmit register is empty. Command TRE is low while information is being shifted out of register 210 and goes high when register 210 is empty. Logic 201 in response to TRE being low inhibits the generation of command TBRLD. This prevents, therefore, information being transferred from buffer 209 to register 210 while information is being shifted out of register 210. TRE is also applied to the sequencer via bus 225, as will be described hereinafter. Command TFF is generated by logic 201 and is applied to register 425. Command TFF indicates that the transmit FIFO is filled and is asserted by logic 201 in response to the IR1, IR2, the IR command being generated by FIFO 207 which is applied to logic 201 and indicates that the transmit FIFO is not ready to accept a character. Command TFF is also generated each time logic 201 generates the TBSI command which indicates that the transmit FIFO cannot receive a command because a character is being strobed into the transmit FIFO. Command TFE is generated by logic 201 is applied to the sequencer via bus 225. Command TFE is asserted when the OR1, OR2 command is generated by FIFO 207 or when the TBSO command is generated by logic 201. Therefore, the TFE command is generated each time a character is stroked out of the transmit FIFO or when the transmit FIFO is ready to transfer a character to UART 208. Command CCTF is the inverse of command TFE and is applied to the command register to place flip-flop 311 in the CLEAR state. Command TMR is generated by logic 201 and is applied to the transmit FIFO and is also applied to detector 205. This command functions to clear the transmit FIFO of the previous characters stored therein and functions to clear detector 205. This command is generated by logic 201 in response to the $\overline{CTF}$ command applied to logic 201 by command register 327. As previously described, command $\overline{CTF}$ is a request by the processor to clear the transmit FIFO. In response to this command, logic 201 generates the TMR command which functions to clear the transmit FIFO. Command ITFC is generated by the sequencer and is applied to logic 201. Logic 201 in response to the command inhibits the generation of the TMR command notwithstanding a clear transmit FIFO request from the processor. The ITFC command ensures that the transmit FIFO is not cleared inadvertently while the ALA is in the process of transmitting polling sequences.

Figure 17:
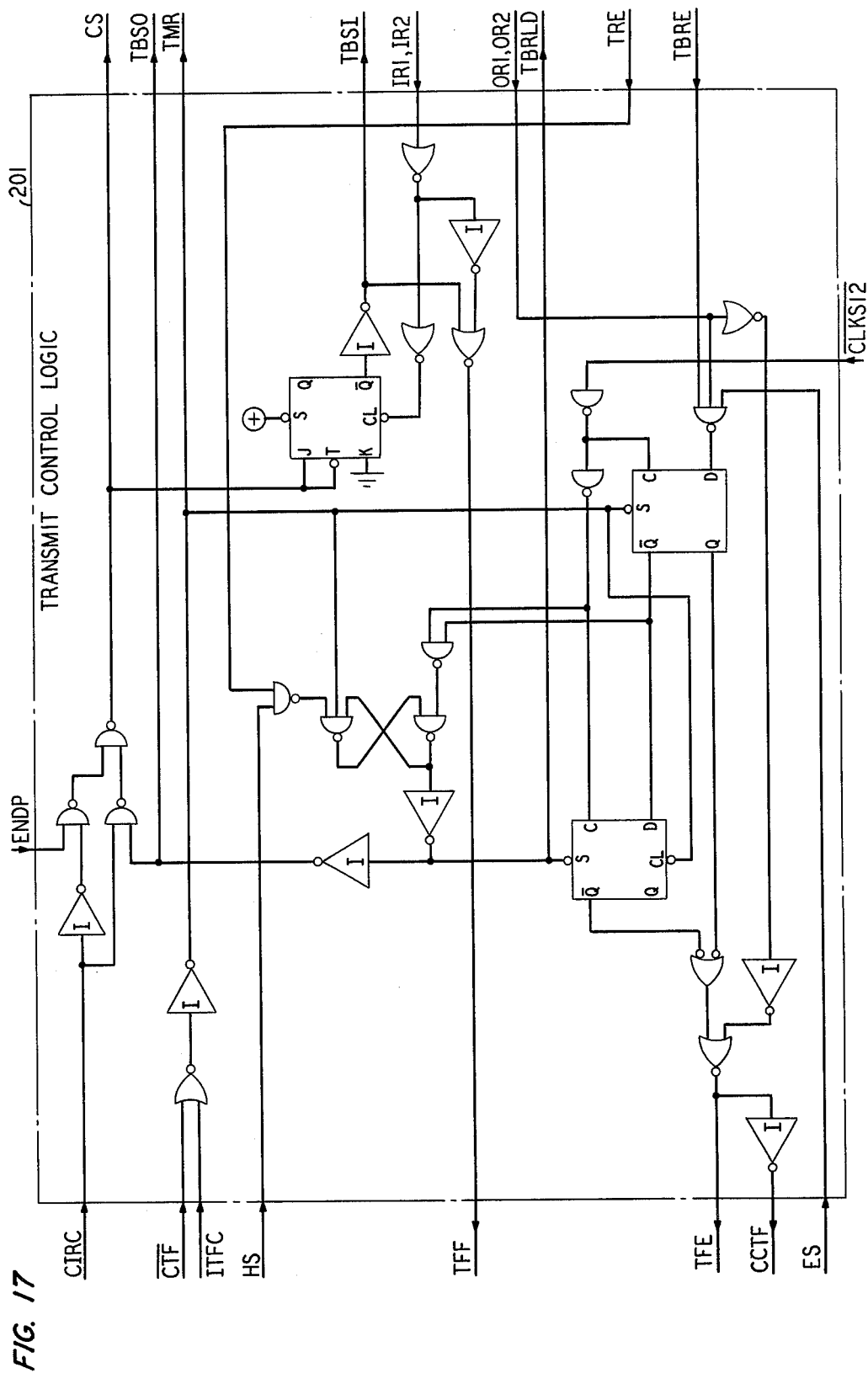

Clock 202 is a free running source of digital clock signals which provides a clock signal to logic 201, and flip-flops 317–320 via inverter 203, data bus 225, and inverter 316. These clock signals are utilized to operate the various logic circuits in a manner easily understood by one skilled in the art by reference to the details of the various logic circuits. The details of the transmit logic are shown in FIG. 17 and the operation of the transmit logic will be clear to one skilled in the art upon examination of FIG. 17.

Receive Logic

As described above, the receive logic consists of control logic 221, error store 222, receive FIFO 219 and the receive portion of the UART. Control logic 221 accepts various commands from sections in the ALA and in response thereto generates additional commands necessary to operate the receive logic. Command RFF is generated by logic 221 and is applied to register 425 indicating to the processor that the receive FIFO is filled. This command is asserted each time the IR1, IR2 command is generated by buffer 219 or when logic 221 generates the RBSI command. The IR1, IR2 command indicates that the receive FIFO is ready to receive information at its input. The RBSI command which is similar to the TBSI command is asserted each time the IR1, IR2 command is asserted by the receive FIFO and the UDR command is asserted by the UART. The RBSI command is also applied to error store 222 and functions to clear the receive error store. Command CRF is generated by the processor and is applied to logic 221 via flip-flop 312. Logic 221 in response to this command generates command RMR which is a master reset to clear the receive FIFO. Command CRF, as described above, is generated by the processor each time certain error conditions are detected. Command CRFP is generated by the sequencer and is utilized to place flip-flop 312 in the SET state. Command RBSI is generated by logic 221 in response to the logical AND of the IR1, IR2 and UDR commands. IR1, IR2 is asserted by the receive FIFO when it is ready to receive data and UDR is asserted by the UART when it is ready to transfer data to the receive FIFO. Each time a transfer is made between the UART and the receive FIFO, logic 221 generates the DRR command which functions to reset the data ready flag in the UART. Command RBSO is generated by logic 221 and applied to receive FIFO 219. This command strobes information out of the receive FIFO which is applied to register 220. Command RBSO is generated each time logic 221 receives the OR1, OR2 command from the receive FIFO. Command RBSO is cleared in response to the ENDR command being applied to logic 221 by logic 200. Command CCRF is generated in response to the absence of the UE command from error store 222, and the presence of command RFE, which is the inverse of command RBSO. Command CCRF is used to place flip-flop 312 in the CLEAR state.

Error store 222 receives certain error conditions from the UART and in response thereto generates the UE command indicating a UART error. More particularly, the UART generates two error signals. These signals are error signals OE indicating an overflow error which occurs when an attempt is made to load a character into the receive buffer while the receive buffer is filled. The remaining error signal generated by the UART is error signal FE which is asserted each time the stop bit is missing from an incoming character. When either of these error signals are applied to error store 222, command $\overline{UE}$ is generated and applied to logic 221. Logic 221 in response to the CRF command applied thereto generates the RMR command which functions to clear the receive FIFO and also functions to reset error store 222 in preparation for the detection of subsequent errors. Command $\overline{UE}$ is also applied to one input of gage 422 and functions to generate the ERR command as described above.

Figure 12:
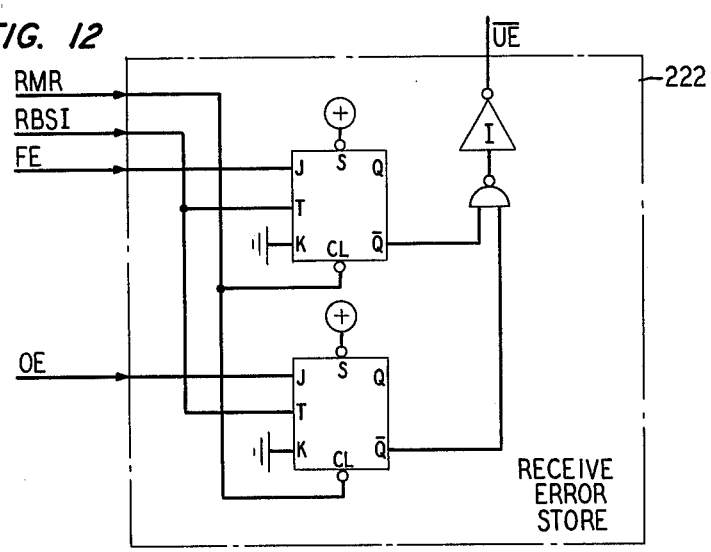
Figure 15:
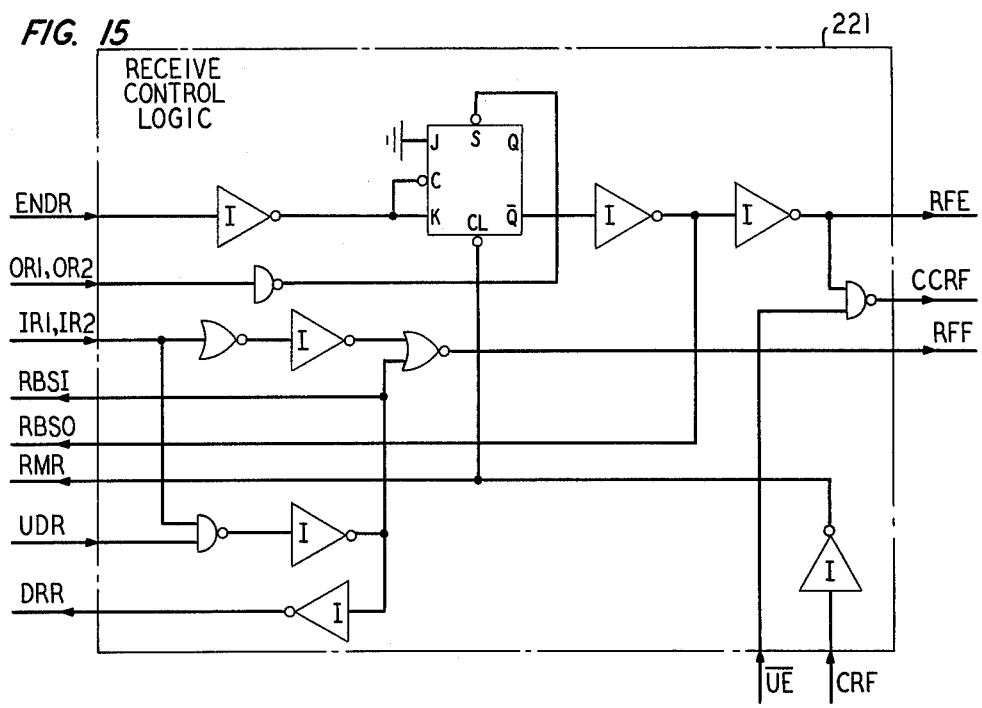

The details of the logic 221 and logic 222 are shown in FIGS. 15 and 12 respectively and the operation of this logic will be clear to one skilled in the art upon examination of FIGS. 15 and 12.

Transceiver

FIG. 4 illustrates a block diagram representation of the ALA transceiver. Command $\overline{RS}$ is a mode command for modem 402. More particularly, the $\overline{RS}$ command being equal to a logical "0." This places the modem in the transmit mode of operation. Baseband data signals from the ALA are applied to input DAT of modem 401. The modem converts the baseband signals into an FSK signal consisting of mark and space frequencies. The FSK signal is applied to the PTD output of modem 402 and from there the FSK signal is applied to filter 403. Filter 403 smooths the signals into an approximate sine wave and applies it via resistor 408 and transformer 409 to output terminals 417 and 418. Resistor 411 and varistor 410 provide lightning protection for the transmit path of the transceiver. To place the transceiver in the receive mode, command $\overline{RS}$ is set to a logical "1" level. This, in turn, applies a logical "1" to the CDRX input of modem 402. Incoming FSK signals are applied to input terminals 419 and 420 and are applied via transformer 413 to filter 407. Lightning protection is provided for the receive path of the transceiver by varistor 412 and resistor 415. Resistor 414 provides 600 ohm termination for the input path. Filter 407 is a high-pass filter which provides 10db of attenuation for the incoming signal. Equalizer 405 provides fixed gain and delay equalization of the telephone channel and also rejects out-of-band noise. Limiter 404 converts the receive signal into an approximately constant amplitude square wave. The incoming signal, after processing by limiter 404, is applied to the AMPD and LIM inputs of modem 402. The modem responds to the incoming signal and applies a carrier detection signal to output CFOX which is applied to path RCD and $\overline{RCD}$ via inverter 416. Command RCD is utilized by the ALA circuitry to detect the presence of incoming messages from the remote terminal. Modem 402 in response to the incoming signal applied to the LIM input converts the signal into baseband data and applies the baseband data to output PBX, and in turn to output RD and bus 225. The receive data is utilized by the ALA as described above.

Two Byte Poll Detector

Figure 13:
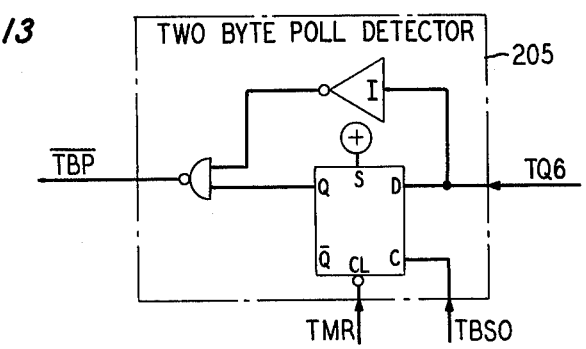

Two byte poll detector 205 functions to determine whether a single poll or a double poll is being transmitted by the transmit logic as described above. The two byte poll detector consists of a 1-bit buffer and comparator circuit. Command TBSO clocks the seventh bit of the remote terminal address into the poll detector's buffer. The seventh bit of the remote terminal address is a logical "1" for a primary switch address and is a logical "0" for a secondary switch address. Detection of a two byte poll by detection 205 results in assertion of command $\overline{TBP}$ which is applied to sequencer 326. The manner in which the sequencer utilizes this command will be subsequently described. The details of detector 205 are shown in FIG. 13 and operation of the detector will be clear to one skilled in the art upon examination of FIG. 13.

Serial Data Control Logic

Figure 14:
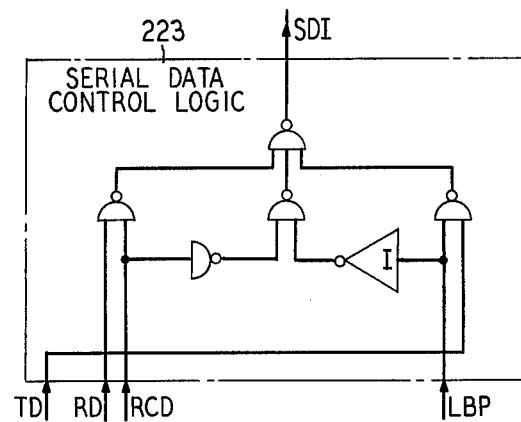

The serial data control logic data from UART 208 to the transceiver and accepts data from the transceiver for use by the UART. In addition, serial data from the transmit section of the UART is also gated to the receive section of the UART via the serial data control logic when the ALA is polling. This allows each remote terminal address to be stored in the receive section of the UART as it is transmitted to the multipoint switches. The serial data control logic, in response to a high on the RCD input, gates received data on input RD to output SDI and from there to the receive section of the UART. In addition, the serial data control logic in response to an LBP command from the sequencer gates incoming data on input TD to output SDI and via path 228 to the receive section of the UART. The details of logic 223 are shown in FIG. 14 and the operation of logic 223 will be clear to one skilled in the art upon examination of the detailed drawing.

Activity Detector

Figure 16:
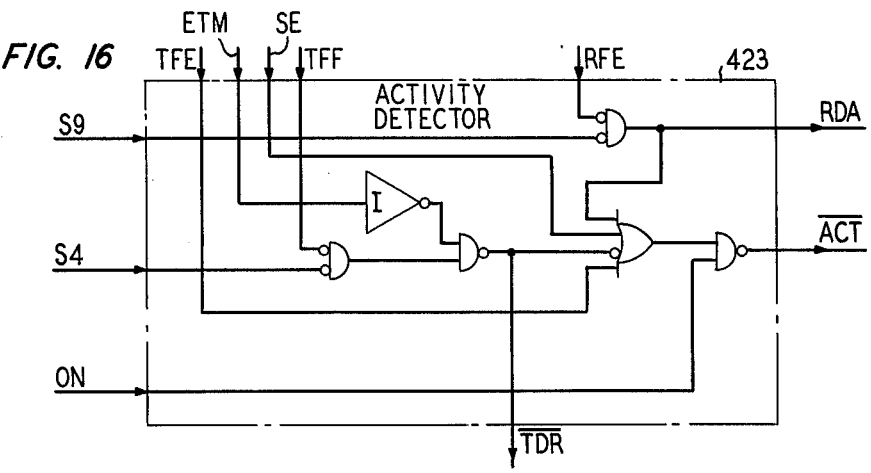

Activity detector 423 functions to detect certain states in the ALA and in response thereto transmits certain commands to the processor. When the activity detector is enabled by the ON comand, the $\overline{ACT}$ command is asserted if the following conditions exist in central station 103. The activity detector generates command $\overline{TDR}$ which, as described above, indicates to the processor that the ALA is in the transmit mode but that there are no characters in the transmit buffer to be sent out. This, therefore, is a request to the processor to place additional information in the ALA. $\overline{TDR}$ is generated by detector 423 in response to state S4 from the sequencer, the TFF command being low and the ETM latch being low. State S4 indicates that the sequencer is in the transmit mode, $\overline{TFF}$ indicates that the transmit FIFO is not full and ETM being low indicates that the end of the transmitted message has not yet occurred and that there are additional characters to be sent. When these three conditions occur, detector 423 generates command $\overline{TDR}$ and also sets activity flag $\overline{ACT}$. The activity flag is an indication to the processor that the ALA is requesting the processor to perform a status check. The processor upon performance of the status check detects command TDR via register 220 which indicates to the processor that the ALA is requesting additional data to be transmitted. The activity detector also generates command RDA. As described above, command RDA indicates to the processor that there is received data in the receive FIFO ready for transmission to the processor. Detector 423 generates command RDA in response to the sequencer being in state S9 which is the sequencer's read mode and in response to command $\overline{RFE}$ which indicates that the receive FIFO is not empty. The activity flag $\overline{ACT}$ is also asserted each time command RDA is generated which indicates to the processor that a status check is necessary and $\overline{ACT}$ is also generated each time TFE is applied to the activity detector. The remaining condition for which the activity detector is set is when the sequencer inadvertently becomes locked in state S13. When this occurs, sequencer output SE is applied via gate 422 and is applied to the ERR input of register 425. The activity detector raises the activity flag, causing the processor to perform a status check at which time the processor would detect the error conditions. This error condition indicates to the processor that the sequencer is malfunctioning and that corrective measures must be taken. The details of the activity detector are shown in FIG. 16 and operation of the activity detector will be clear in view of the details in FIG. 16 and the previous discussion.

Timer

Timer 314 is utilized to count and store the clock signal from clock 315. In response thereto, timer 314 generates certain time intervals for use by the sequencer. The timer is initialized and each of its outputs are reset whenever the UART is transmitting, which is indicated by the application of command TRE to the timer, the transceiver is receiving indicated by command $\overline{RCD}$ being applied to the timer, the sequencer is in a CLEAR timer state indicated by command $\overline{TO}$ being applied to the timer, or when the OFF command is set by the processor. The OFF command resets the timer and the timer begins counting in response to the ON command. When the timer is not reset by one of the aforementioned commands, it continues to count until one or more of its output intervals are reached. The timer has four outputs. Output ACC is approximately a 10.2 millisecond interval which is monitored by the sequencer to ensure that the correct amount of stop bits (marking signal) precedes the remote terminal address in the polling sequences. Output ATC indicates an interval of approximately 11.6 milliseconds. This interval is monitored by the sequencer to ensure the proper amount of stop bits which follows a remote terminal address in the polling sequence. Output MTL indicates an interval of approximately 4.2 milliseconds. This interval is utilized by the sequencer to delay transmission of a return message to the remote terminal a predetermined interval of time. This delay immediately follows an incoming message from the remote terminal and it is necessary to allow the various modems in the system to turn around. Output SPL indicates an interval between approximately 27 to 50 milliseconds. This interval is utilized by the sequencer to determine the silent interval following the transmission of a remote terminal address. This silent interval can be generated in a number of steps from 27 to 50 milliseconds depending on the physical distance separarting the ALA and the remote terminals. Assertion of command SPL to the sequencer informs the sequencer that the silent interval has ended and that new transmission sequence can begin.

The sequencer

As described above, the sequencer is the heart of the ALA and functions to provide control signals to operate. the remaining sections of the ALA. The various communications sequences generated by the ALA are indicated in FIG. 8 and have been described above. Line A, FIG. 8, indicates a single poll sequence. A single poll sequence consists of an interval of marking carrier determined by interval ACC, the remote terminal address and a trailing interval of marking carrier determined by interval ATC. Subsequent thereto, the sequencer enters a silent interval which, as described above, is determined by interval SPL. During the silent interval the sequencer waits for a response from the remote terminal. If a response is not forthcoming, the sequencer then continues the polling sequence as will be subsequently described. Line B, FIG. 8, illustrates a double poll sequence. A double poll sequence is formulated by the sequencer when a remote terminal attached to a secondary multipoint switch is being polled. As described above, a double poll sequence is detected by two byte poll detector 205. A double poll sequence consists of a single poll sequence followed by an additional remote terminal address and an additional interval of marking tone. The double poll sequence is followed by a silent interval as is the single poll sequence. Line C, FIG. 8, indicates the communication sequences generated by the sequencer when the central station is transmitting a reply to a remote terminal. As is shown in line C, the sequencer detects the termination of receive carrier from the remote terminal. Subsequent thereto, the sequencer waits the MT interval and thereafter transmits an interval of stop bits, a control charactor and the message text to the remote terminal. This is again followed by a silent interval during which the sequencer waits for a remote terminal response. Line D, FIG. 8, illustrates the communication sequences generated by the sequencer when a return message from a data base computer is being transmitted to a remote terminal. As is shown in line D, this sequence consists of a double poll sequence followed by a control character and the text of the message. This sequence is again followed by a silent interval during which the sequencer waits for a remote terminal response. Although line D indicates the message being preceded by a double poll sequence, it is to be understood that this sequence is also used to return a message to a terminal located on a primary switch as has been described above. Line E, FIG. 8, illustrates the communication sequences generated by the sequencer when the processor wishes to perform a test of an MPS section and wishes to perform the line interchange function. The purpose of the test message and line interchange functions has been described above. As is indicated in line E, the sequence consists of a single poll followed by a silent interval during which the ALA receives the test message from the multipoint switch and transfers the test message to the processor. This interval is then followed by a double poll sequence which is used to perform a line interchange as described above.

Refer now to FIG. 9. Therein is shown a state diagram for the sequencer. A state table for the sequencer is shown in FIG. 10. Each circle in FIG. 9 labeled S0, S1 and so on indicates the various states of the sequencer. Included within each circle is a list of sequencer outputs. State S0 is the idle state in which the various outputs of the sequencer are shown. Shown in the remaining circles are the outputs of the sequencer which have changed from state to state. Only the outputs which have changed are shown in the state diagram except for state S0 which shows all the sequencer outputs. Each state is connected with a path on which is shown the sequencer input or inputs necessary for the sequencer to move from one state to the next.

The OFF command initializes the sequencer by setting it to state S0. When the ON command is received from the processor, the timer will begin running. The sequencer then monitors its inputs to determine when a state change will occur. Assume that the processor desires to instruct the ALA to transmit single poll sequences to the remote terminals. Before instructing the ALA to begin polling, the processor loads a list of remote terminal addresses in the transmit FIFO as described above. While loading the addresses into the transmit FIFO the processor asserts command NOP to the ALA which, as described above, prevents the ALA from polling. Refer now to FIG. 9 and more particularly to path 900 extending between state S0 and state S1. The conditions associated with that path are all the conditions necessary for the sequencer to move from S0 to S1. Each is shown in FIG. 9. These conditions include the logical AND of the ON command and the RCD command from the transceiver. In addition, the sequencer will move from state S0 to state S1 in response to the logical AND of the ON command and the SPL signal from the timer, the $\overline{\text{NOP}}$ command and the $\overline{\text{TFE}}$ command. The processor subsequent to loading the remote terminal addresses in the transmit FIFO clears command NOP such that $\overline{\text{NOP}}$ is asserted to the sequencer. The transmit FIFO at this time has addresses stored therein such that command $\overline{\text{TFE}}$ will be asserted to the sequencer. Therefore, when state SPL is asserted to the sequencer by the timer, the sequencer will move from state S0 to state S1. In state S1 the sequencer clears the timer with command $\overline{\text{TO}}$. The sequencer also asserts the LBP command to the serial data control logic which commands this logic to loop back the transmitted polling sequences to the receive buffer. The sequencer also asserts command $\overline{\text{DONE}}$ which is applied to register 220 and indicates to the processor that the ALA has left the idle mode and is beginning to poll. The sequencer in state S1 monitors the RCD command from the transceiver. $\overline{\text{RCD}}$ indicates that there are no incoming messages from the remote terminal and that the sequencer can proceed with the polling sequence. Upon detection of $\overline{\text{RCD}}$, therefore, the sequencer moves from state S1 to state S5 via path 901. In state S5 command $\overline{\text{RS}}$ is asserted to the transceiver which in response thereto begins transmitting marking tone. Command TO is asserted to the timer which allows the timer to begin timing interval ACC. Command ITFC is applied to the transmit control logic which, as described above, inhibits command CTF thereby preventing the transmit FIFO from being cleared during polling. Command CRFP is applied to the receive control logic which functions, as described above, to clear the receive FIFO in preparation for the loopback of the transmitted addresses. The sequencer remains in state S5 until ACC is detected from the timer. In response thereto the sequencer moves from state S5 to state S7 via path 905. In state S7 command ES is applied to the transmit control logic which in response thereto generates the TBSO command as described above. This functions to strobe one character from the transmit FIFO into the UART in preparation for transmission. Command $\overline{\text{TO}}$ is applied to the timer which resets the timer. The sequencer also clears command CRFP which allows the address which is going to be transmitted by the UART to be loaded into the receive FIFO. The sequencer monitors commands TBP and BTM to determine upon which path it will proceed from state S7. The logical AND of TBP and BTM indicates that a two byte poll is not being transmitted and also indicates that a message is not being transmitted to the remote terminal. In response to these conditions the sequencer takes path 907 from state S7 to state S3.

In state S3 the sequencer clears command ES which prevents the transmit control logic from generating command TBSO. Therefore, no additional addresses are applied to the UART. Command TO is applied to the timer which allows the timer to begin counting the ATC interval. Command ITFC is also cleared by the sequencer which instructs the transmit control logic that the transmit buffer could now be cleared by the processor, if necessary. Command IFTC is asserted by the sequencer only when the remote terminal address is being transferred from the transmit FIFO to the UART. Subsequent to the transfer, ITFC is cleared which allows the processor, if necessary, to clear the transmit FIFO and load it with a message. While in state S3 the poll address which has been loaded into the UART is transmitted. While transmitting, command TRE keeps the timer cleared. The sequencer remains in state S3 until the address character is transmitted and until interval ATC is detected. In response to interval ATC the sequencer moves on path 903 to state S2.

In state S2 command TO is cleared which resets the timer. Command LBP is also cleared which instructs the serial data control logic to discontinue its loopback function. The sequencer then moves to state S0.

The sequencer will remain in state S0 until the timer reasserts the SPL interval. This indicates to the sequencer that the silent interval has ended and that the process described above can be repeated for the transmission of an additional polling sequence. While the sequencer is in the polling mode, the processor asserts the CIRC command which allows the transmitted addresses to be recirculated from the transmit FIFO to the input of register 206 as described above. Therefore, during polling register 206 and the transmit FIFO function as a recirculating store such that addresses which are being transmitted are recirculated throughout the store in a continuous process. This process would continue until the sequencer is interrupted by commands from the processor or by a response from a remote terminal.

The double poll sequence begins in the same manner as does the single poll sequence. The sequencer in response to the logical AND of commands ON, SPL, NOP and TFE moves from state S0 to state S1. The sequencer precedes to state S7 in the same manner as described above for the single poll sequence. For a double poll sequence the sequencer in state S7 will detect command TBP. In response thereto the sequencer takes path 915 to state S15. In state S15 command TO enables the timer. In state S15 command ES which was asserted in state S7 is still applied to the transmit control logic. Therefore, the second address in the double poll sequence is loaded into the UART in state S15. The sequencer also asserts command HS to the transmit control logic which, as described above, functions to hold the second address in the UART buffer while the first address is being transmitted. Upon receipt of interval ACC from the timer, the sequencer moves from state S15 via path 911 to state S11.

In state S11 the sequencer clears command HS which allows the second address to be transferred from the UART buffer to the UART transmit shift register. Command ES is cleared which prevents further transfers of addresses from the transmit FIFO to the UART. Command TO is cleared which initializes the timer. Command BTM is monitored in state S11. BTM indicates to the sequencer that the instant transmission is a double poll sequence. In response to BTM the sequencer moves to state S3 via path 913. The sequencer progresses from state S3 back to state S0 in the same manner as described above for the single poll sequence.

Assume now that a message is incoming from a remote terminal. This is detected by the sequencer in state S0, by the logical AND of command ON and RCD. The sequencer moves via path 900 to state S1 and continues to state S9 in response to the RCD command. When the sequencer enters state S9, the activity flag is asserted to the processor in the manner described above. The activity detector also generates at this time the RDA command. These two conditions notify the processor that information is incoming from a remote terminal.

In state S9 command TO is applied to the timer which, when RCD is equal to a logic "0," functions to start the timer. Command LBP is cleared by the sequencer which prevents the loopback mode as previously described. The processor upon receipt of the RDA command is informed that the sequencer is in state S9 and is also informed that receive data is available. The processor then applies command CTF to the the command register which functions to clear the transmit FIFO. The processor also applies the LDR command to the processor control logic which in response thereto generates the ENDR command which is applied to register 220. Register 220 in response to the ENDR command gates the incoming characters which have been stored in the receive buffer to the computer via bus 224. Each time the processor gates information out of the receive buffer it checks status and this status includes the RDA command which has been applied to register 425, as previously described. The RDA command remains set as long as receive data is available in the receive FIFO. Therefore, each time the processor checks status the RDA command indicates that additional characters are available for transmission to the processor. In response thereto the processor continues to supply the LDR command to the processor control logic which results in the characters in the receive buffer being gated from the receive FIFO to register 220. The sequencer remains in state S9 until all of the incoming characters have been gated from the receive FIFO to the processor. The sequencer exits state S9 upon the logical AND of three conditions. These conditions are that the receive FIFO must be empty meaning command RFE is high, there must be an absence of incoming carrier meaning that command RCD must be low and the transmit FIFO must have characters stored therein meaning that command TFE must also be low. It is necessary that characters be stored in the transmit FIFO before the sequencer can leave state S9 in order that the sequencer has other tasks to perform before exiting state S9. Characters stored in the transmit FIFO means that the sequencer has additional tasks to perform upon leaving state S9.

Upon leaving state S9 the sequencer proceeds to state S8 via path 908. The sequencer in state S8 monitors the reply command bit. The reply command bit is set by the processor while the sequencer is in state S9. If the reply command is set, it indicates that the processor desires to transmit a reply message to the remote terminal and that the reply message will be stored in the terminal FIFO. If the reply command is not set, it indicates that there is no response to be transmitted from the processor to the remote terminal. Therefore, the sequencer in state S8 in response to the reply command not being set proceeds from state S8 to state S0. The sequencer will then remain in state S0 until commanded to leave as described above. The sequencer in response to the reply command being set proceeds from state S8 to state S12 via path 912. The sequencer monitors the MTL output of the timer while in state S12. At the conclusion of the MTL interval the sequencer moves from state S12 to state S14 via path 914. In state S14 the sequencer asserts the $\overline{TO}$ command to the timer which clears the timer as described above. The sequencer also asserts the $\overline{RS}$ command to the transceiver which turns on carrier. The sequencer then takes path 910 from state S14 to S10. The sequencer in state S10 applies command TO to the timer which allows the timer to begin measuring the ACC interval. The sequencer will remain in state S10 until the ACC interval is asserted to the sequencer by the timer. Command $\overline{ITFC}$ shown in states S10 is only utilized while transmitting a message from the data base to the remote terminal as will be subsequently described. Upon assertion of the ACC interval by the timer the sequencer moves from state S10 to state S4 via path 904. In state S4 the sequencer asserts command ES to the transmit control logic which generates the TBSO strobe command as previously described. The sequencer continues to assert the ES command to the transmit control logic while in state S4. As long as command ES remains high, the transmit control logic continues to generate command TBSO which strobes the information stored in the transmit FIFO to the UART. Command $\overline{LBP}$ shown in states S4 is utilized while transmitting a message from the data base to the remote terminal as will be subsequently described. The sequencer remains in state S4 until it receives the TFE command from the transmit control logic and the ETM command from the command register. As described above, command TFE indicates that the transmit FIFO is empty and command ETM is set by the processor after the last character has been loaded into the transmit FIFO. When these two conditions are met, the sequencer moves from state S4 to state S6 via path 906. During the transition from state S4 to state S6, the sequencer generates the CLRML command which, as described above, functions to clear the BTM, ETM and RPY latches in the command register. In state S6 the sequencer clears the ES command which prevents further generation of the TBSO pulse. The sequencer also clears the CLRML command. The sequencer remains in state S6 until it receives the TRE command from the transmit control logic indicating that the transmit register in the UART is empty. This means that the last character in the UART has been transmitted to the remote terminals. The sequencer then proceeds from state S6 to state S2 via path 916. The functions performed by the sequencer in state S2 have been described above and upon the completion of these functions the sequencer proceeds to S0, the idle state.

The remaining sequence performed by the sequencer is the transmission of a message from the data base to the remote terminal. The sequencer exits from the idle state in response to the logical AND of the ON command, the SPL command, the $\overline{NOP}$ command and the TFE command. The sequencer proceeds from state S0 through S7 in the manner described above. In state S7 the sequencer monitors the BTM command which is set by the processor when a message is to be transmitted from the data base to the remote terminal. The sequencer in response to the BTM command being set moves from state S7 to state S15 via path 915. The sequencer proceeds from state S15 to state S11 in the manner described above. The BTM command is still set such that the sequencer proceeds from state S11 to state S10 via path 917. In state S10 the TO command is asserted by the sequencer which enables the timer. Also in state S10 the ITFC command is cleared which, as described above, enables the transmit FIFO to be cleared by the processor if necessary. However, as we are at this time transmitting a message to the remote terminal, the processor would not normally clear the transmit FIFO. The sequencer remains in state S10 until assertion of the ACC command by the timer at which time the sequencer moves to state S4. In state S4 the sequencer asserts the ES command, as has been described above, and also clears the LBP command which prevents additional loopback as previously described. The sequencer remains in state S4 while the message stored in the transmit FIFO is transmitted to the remote terminal. The sequencer then moves through states S6 and S2 back to state S0 in the manner described above.

The remaining sequence generated by the sequencer is the test message and line interchange sequence shown in FIG. 8. The test message sequence is the same as a single poll sequence as has been described above wherein the transmitted address is the test port address. The line interchange sequence is the same as a double poll sequence. As these sequences have been described, they will not be detailed further.

Although a specific embodiment of this invention has been shown and described, it will be understood that various modifications may be made without departing from the spirit of this invention.

What is claimed is:

1. A multipoint polling system, comprising a plurality of remote terminals and a central station, the central station including means for providing a list of remote terminal addresses, the list of remote terminal addresses defining selective ones of the remote terminals to be polled via a signaling path extended from the central station to the remote terminals, the list of remote terminal addresses being divided into predefined portions, each portion comprising a plurality of remote terminal addresses, each address in the list appearing in at least one of the portions, characterized in that the polling system further includes:

means for storing one of the portions of the list of remote terminal addresses and for transmitting individual ones of the stored remote terminal addresses to the signaling path, and means for periodically requesting a different one of the portions of the list of remote terminal addresses from the providing means and for replacing the stored portion of remote terminal addresses with the requested portion of remote terminal addresses, whereby different subsets of remote terminals defined by the different address list portions are polled.

2. A multipoint polling system in accordance with claim 1 wherein the polling system further includes a multipoint switch, the multipoint switch being comprised of a plurality of sections, each section arranged to receive a different one of the portions of the remote terminal addresses transmitted to the signaling path and including means responsive to the remote terminal addresses for extending the signaling path from the central station to selected ones of the remote terminals defined by the remote terminal addresses, and means responsive to the failure of a first multipoint switch section to respond to remote terminal addresses transmitted thereto for transmitting to a second section of the multipoint switch the portion of remote terminal addresses normally received by the second section and the portion normally received by the first section.

3. A multipoint polling system in accordance with claim 2 wherein there is further included means responsive to the commencement of a message transmission on the signaling path between the central station and the selected remote terminal for suspending the transmission of remote terminal addresses and means operative subsequent to the termination of the message transmission for requesting a different list of remote terminal addresses from the providing means and for recommencing transmission of the remote terminal addresses to the multipoint switch.

4. A multipoint polling system in accordance with claim 2 wherein each section of the multipoint switch is connected to the central station via an associated signaling path, means included in a first section of the multipoint switch for commencing a test message transmission from the first section to the central station via the associated signaling path and means included in a second section of the multipoint switch and responsive to the failure of the central station to receive the test message for interchanging the signaling paths connecting the first and second sections to the central station, and for commencing a test message transmission from the second section to the central station.

5. A multipoint polling system in accordance with claim 4 wherein each multipoint switch section further includes an addressable test port, means responsive to the reception of a single test port address for enabling the commencing means and responsive to the reception of two sequential test port addresses for enabling the interchanging means.

6. A multipoint data communications sytem including a multisection multipoint switch, a central controller and a plurality of remote terminals, the central controller including means for transmitting a separate portion of remote terminal addresses to each section of the multipoint switch, each section of the multipoint switch including means responsive to the remote terminal addresses transmitted thereto for establishing communications paths between the central controller and selected ones of the remote terminals defined by the remote terminal addresses, characterized in that the central controller further includes, means included in the transmitting means and responsive to the failure of a multipoint switch section to respond to remote terminal addresses for transmitting the portion of addresses normally transmitted to the failed section of the multipoint switch and the portion of addresses normally transmitted to a remaining active section of the multipoint switch to the remaining active section of the multipoint switch.

7. A multipoint data communications system in accordance with claim 6 wherein the central controller includes means for providing a list of remote terminal addresses, the transmitting means further including means for storing a portion of the list of remote terminal addresses and for transmitting individual ones of the stored remote terminal addresses to the multipoint switch and means for periodically requesting different portions of the list of remote terminal addresses from the providing means and for replacing the stored portion of remote terminal addresses with the requested portion of remote terminal addresses.

8. A multipoint data communications system in accordance with claim 7 wherein the requesting means further includes, means responsive to the commencement of a message transmission on the established communications path between the central station and the remote terminals for suspending the transmission of remote terminal addresses and means operative subsequent to the termination of the message transmission for requesting a different group of remote terminal addresses from the providing means and for recommencing the transmission of remote terminal addresses to the multipoint switch section.

9. A multipoint data communications system in accordance with claim 8 wherein each section of the multipoint switch is connected to the central controller via an associated signaling path, means included in a first section of the multipoint switch for commencing a test message transmission from the first section to the central controller via the associated signaling path and means included in a second section of the multipoint switch and responsive to the failure of the central controller to receive the test message for interchanging the signaling paths connecting the first and second sections to the central controller, and for commencing a test message transmission from the second section to the central controller.

10. A multipoint data communications system in accordance with claim 9 wherein each multipoint switch section further includes an addressable test port, means responsive to the reception of a single test port address for enabling the commencing means and responsive to the reception of two sequential test port addresses for enabling the interchanging means.

11. A multipoint data communications system, comprising a central station, a plurality of remote terminals and a multisection multipoint switch, each section of the multipoint switch being connected to the central station via an associated signaling path and including means responsive to remote terminal addresses transmitted on the signaling path from the central station for extending the signaling path to selected ones of the remote terminals defined by the remote terminal addresses characterized in that the multipoint switch further includes:
  means included in a first section of the multipoint switch for commencing a test message transmission from the first section to the central station via the associated signaling path; and
  means included in a second section of the multipoint switch and responsive to the failure of the central station to receive the test message for interchanging the associated signaling paths connecting the first and second sections to the central station and for commencing a test message transmission from the second section to the central station.

12. A multipoint data communications system in accordance with claim 11 wherein the central station includes means for providing a list of remote terminal addresses, the data communications system further including means for storing a portion of the list of remote terminal addresses and for transmitting individual ones of the stored remote terminal addresses to the multipoint switch and means for periodically requesting different portions of the list of remote terminal addresses from the providing means and for replacing the stored portion of remote terminal addresses with the requested portion of remote terminal addresses.

13. A multipoint data communications system in accordance with claim 12 wherein there is further included means for detecting the failure of the first multipoint switch section to respond to remote terminal addresses, the transmitting means further including means responsive to the detecting means for transmitting the remote terminal addresses destined for the first section and the remote terminal addresses destined for the second section to the second section of the multisection multipoint switch.

14. A multipoint data communications system in accordance with claim 12 wherein the requesting means further includes means responsive to the commencement of a message transmission on the extended signaling path between the central station and the selected remote terminal for suspending the transmission of remote terminal addresses to the remote terminals and means operative subsequent to the termination of the message transmission for requesting a new list of remote terminal addresses from the providing means and for recommencing transmission of the remote terminal addresses to the multipoint switch.

15. A multipoint data communications system in accordance with claim 11 wherein each multipoint switch section further includes an addressable test port, means responsive to the reception of a single test port address for enabling the commencing means and responsive to the reception of two sequential test port addresses for enabling the interchanging means.

16. A method for polling a plurality of remote terminals including a central controller which provides a list of remote terminal addresses, the list of remote terminal addresses being divided into predefined portions, each portion comprising a plurality of remote terminal addresses, each address in the list appearing in at least one of the portions, the method comprising the steps of,
storing one of the portions of the list of remote terminal addresses and transmitting individual ones of the stored remote terminal addresses to a signaling path extending from the central controller to the remote terminals,
periodically requesting a different one of the portions of the list of remote terminal addresses from the central controller, and
replacing the stored portion of remote terminal addresses with the requested portion of remote terminal addresses, whereby different subsets of remote terminals defined by the different address list portions are polled.

17. A method for polling a plurality of remote terminals in accordance with claim 16 wherein a multisection multipoint switch selectively connects remote terminals to the central controller in response to the transmitted remote terminal addresses, of the multisection multipoint switch, each section being connected to the central controller via a dedicated signaling path, the method further including the steps of: periodically requesting a test message transmission from a first section of the multipoint switch to the central controller via the dedicated signaling path, detecting the failure of the central controller to receive the test message transmission, replacing the dedicated signaling path between the central controller and the first section with an auxiliary signaling path, and requesting another test message transmission from the first section of the multipoint switch to the central controller via the auxiliary signaling path.

18. A method of detecting and correcting for equipment failure in a multipoint data communications system, the system comprising, a central controller, a plurality of remote terminals and a multisection multipoint switch, each section of the multipoint switch being capable of establishing a signaling path between the central controller and any one of the plurality of remote terminals in response to groups of remote terminal addresses transmitted to each multipoint switch section from the central controller, the method comprising the steps of,
detecting the failure of a first multipoint switch section to respond to a first group of remote terminal addresses,
transmitting the first group of addresses normally transmitted to the first multipoint switch section and a second group of addresses normally transmitted to a second multipoint switch section to the second multipoint switch section, and,
utilizing the second multipoint switch section to establish signaling paths between the remote terminals defined by the first and second groups of addresses and the central controller.

19. A method in accordance with claim 18 wherein the central controller contains a plurality of remote terminal address groups, the transmitting step further including the steps of, storing a group of remote terminal addresses, transmitting individual ones of the stored remote terminal addresses to the multipoint switch, periodically requesting different groups of remote terminal addresses from the central controller and replacing the stored group of remote terminal addresses with the requested group of remote terminal addresses.

* * * * *